(12) United States Patent
Nagata

(10) Patent No.: US 11,294,591 B2
(45) Date of Patent: Apr. 5, 2022

(54) APPARATUS CONFIGURED TO CREATE EXTENDED CONFIGURATION PROPOSAL OF STORAGE SYSTEM INCLUDING MULTIPLE NOTES

(71) Applicant: HITACHI, LTD., Tokyo (JP)

(72) Inventor: Yuki Nagata, Tokyo (JP)

(73) Assignee: HITACHI, LTD., Tokyo (JP)

(*) Notice: Subject to any disclaimer, the term of this patent is extended or adjusted under 35 U.S.C. 154(b) by 34 days.

(21) Appl. No.: 16/814,300

(22) Filed: Mar. 10, 2020

(65) Prior Publication Data
US 2021/0109672 A1    Apr. 15, 2021

(30) Foreign Application Priority Data
Oct. 11, 2019 (JP) .............................. JP2019-187377

(51) Int. Cl.
*G06F 3/06* (2006.01)
(52) U.S. Cl.
CPC ............ *G06F 3/0653* (2013.01); *G06F 3/067* (2013.01); *G06F 3/0614* (2013.01); *G06F 3/0659* (2013.01); *G06F 3/0683* (2013.01)
(58) Field of Classification Search
None
See application file for complete search history.

(56) References Cited

U.S. PATENT DOCUMENTS

| 2004/0225662 A1 | 11/2004 | Nojima |
| 2011/0040935 A1 | 2/2011 | Murayama et al. |
| 2019/0075040 A1* | 3/2019 | Ghosh ................... H04W 40/02 |

FOREIGN PATENT DOCUMENTS

| JP | 2004-334561 A | 11/2004 |
| JP | 2011-039803 A | 2/2011 |

* cited by examiner

*Primary Examiner* — Brian R Peugh
(74) *Attorney, Agent, or Firm* — Volpe Koenig

(57) ABSTRACT

An apparatus creates an extended configuration proposal of a storage system including multiple nodes. A processor of the apparatus is configured to acquire information on requested performance of each host, which accesses the storage system. The processor is configured to acquire information on performance of each of multiple existing nodes of the storage system. The processor is configured to determine a number and performance of one or more additional nodes and a coupling form between the host and the storage system so as to satisfy the requested performance of each host. The processor is configured to include the number and the performance of the one or more additional nodes and the coupling form in the extended configuration proposal.

9 Claims, 48 Drawing Sheets

| HOST ID | COUPLED NODE |
|---------|--------------|
| HOST 1 | NODE 1 DIRECT |
| HOST 2 | NODE 2 DIRECT |
| HOST 3 | INDIRECT |
| HOST 4 | INDIRECT |

COUPLED NODE MANAGEMENT TABLE

| REQUEST ID | REQUESTED ELEMENT | | | |
|---|---|---|---|---|
| | COST (M¥) | CAPACITY (TB) | PERFORMANCE (IOPS) | REDUNDANCY |
| REQUEST 1 | 10 | 300 | 2,000 | 1 NG NODE |
| REQUEST 2 | - | 400 | 3,000 | - |
| REQUEST 3 | 20 | - | 4,000 | 2 NG NODES |

REQUEST MANAGEMENT TABLE

| HOST ID | OPERATION PERFORMANCE (IOPS) | REQUESTED PERFORMANCE (IOPS) |
|---|---|---|
| HOST 1 | 350 | - |
| HOST 2 | 350 | - |
| HOST 3 | 150 | - |
| HOST 4 | 150 | - |
| HOST 5 | - | 350 |
| HOST 6 | - | 350 |
| HOST 7 | - | 150 |
| HOST 8 | - | 150 |

HOST REQUESTED PERFORMANCE TABLE

FIG. 4

| CONFIGURATION MONITORING ID | OBJECT TO BE MONITORED | MONITORING CYCLE | REQUEST ID |
|---|---|---|---|
| CONFIGURATION MONITORING 1 | CAPACITY USE AMOUNT | EVERY 2 HOURS | REQUEST 1 |
| CONFIGURATION MONITORING 2 | CAPACITY USE AMOUNT | EVERY 1 HOUR | REQUEST 2 |

CONFIGURATION MONITORING INFORMATION MANAGEMENT TABLE

| OPERATION MONITORING ID | MONITORING TIME SLOT | REQUEST ID |
|---|---|---|
| OPERATION MONITORING 1 | 8:30~17:00 | REQUEST 1 |
| OPERATION MONITORING 2 | 22:00~3:00 | REQUEST 2 |

OPERATION MONITORING INFORMATION MANAGEMENT TABLE

| NODE ID | NODE TYPE |
|---|---|
| NODE 1 | TYPE A |
| NODE 2 | TYPE A |
| NODE 3 | TYPE A |

NODE CONFIGURATION MANAGEMENT TABLE

| HOST ID | COUPLED NODE |
|---|---|
| HOST 1 | NODE 1 DIRECT |
| HOST 2 | NODE 2 DIRECT |
| HOST 3 | INDIRECT |
| HOST 4 | INDIRECT |

COUPLED NODE MANAGEMENT TABLE

*FIG. 8*

NODE TYPE MANAGEMENT TABLE

NODE PERFORMANCE MANAGEMENT TABLE

HOST PERFORMANCE MANAGEMENT TABLE

PROPOSED CONFIGURATION TABLE (FIRST PROPOSED CONFIGURATION)

PROPOSED CONFIGURATION TABLE (SECOND PROPOSED CONFIGURATION)

PROPOSED CONFIGURATION TABLE (THIRD PROPOSED CONFIGURATION)

| HOST ID | OPERATION PERFORMANCE (IOPS) | REQUESTED PERFORMANCE (IOPS) | COUPLED NODE |
|---|---|---|---|
| HOST 1 | 350 | 350 | NODE 1 DIRECT |
| HOST 2 | 350 | 350 | NODE 2 DIRECT |
| HOST 3 | 150 | 150 | INDIRECT |
| HOST 4 | 150 | 150 | INDIRECT |
| HOST 5 | - | 350 | NODE 3 DIRECT |
| HOST 6 | - | 350 | NODE 4 DIRECT |
| HOST 7 | - | 150 | INDIRECT |
| HOST 8 | - | 150 | INDIRECT |

HOST MANAGEMENT TABLE (FIRST PROPOSED CONFIGURATION)

FIG. 29

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| NODE 1 | TYPE A | 500 | 500 | HOST 1 | 350 | HOST 3<br>HOST 4<br>HOST 7<br>HOST 8 | 37.5<br>37.5<br>37.5<br>37.5 |
| NODE 2 | TYPE A | 500 | 500 | HOST 2 | 350 | HOST 3<br>HOST 4<br>HOST 7<br>HOST 8 | 37.5<br>37.5<br>37.5<br>37.5 |
| NODE 3 | TYPE A | 500 | 500 | HOST 5 | 350 | HOST 3<br>HOST 4<br>HOST 7<br>HOST 8 | 37.5<br>37.5<br>37.5<br>37.5 |
| NODE 4 | TYPE A | 500 | 500 | HOST 6 | 350 | HOST 3<br>HOST 4<br>HOST 7<br>HOST 8 | 37.5<br>37.5<br>37.5<br>37.5 |

NODE MANAGEMENT TABLE (FIRST PROPOSED CONFIGURATION)

FIG. 30

| HOST ID | OPERATION PERFORMANCE (IOPS) | REQUESTED PERFORMANCE (IOPS) | COUPLED NODE |
|---|---|---|---|
| HOST 1 | 350 | 350 | NODE 1 DIRECT |
| HOST 2 | 350 | 350 | NODE 2 DIRECT |
| HOST 3 | 150 | 150 | INDIRECT |
| HOST 4 | 150 | 150 | INDIRECT |
| HOST 5 | - | 350 | NODE 3 DIRECT |
| HOST 6 | - | 350 | NODE 4 DIRECT |
| HOST 7 | - | 150 | INDIRECT |
| HOST 8 | - | 150 | INDIRECT |

HOST MANAGEMENT TABLE (SECOND PROPOSED CONFIGURATION)

*FIG. 31*

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| NODE 1 | TYPE A | 500 | 470 | HOST 1 | 350 | HOST 3<br>HOST 4<br>HOST 7<br>HOST 8 | 30<br>30<br>30<br>30 |
| NODE 2 | TYPE A | 500 | 470 | HOST 2 | 350 | HOST 3<br>HOST 4<br>HOST 7<br>HOST 8 | 30<br>30<br>30<br>30 |
| NODE 3 | TYPE A | 500 | 470 | HOST 5 | 350 | HOST 3<br>HOST 4<br>HOST 7<br>HOST 8 | 30<br>30<br>30<br>30 |
| NODE 4 | TYPE A | 500 | 470 | HOST 6 | 350 | HOST 3<br>HOST 4<br>HOST 7<br>HOST 8 | 30<br>30<br>30<br>30 |
| NODE 5 | TYPE A | 500 | 120 | - | - | HOST 3<br>HOST 4<br>HOST 7<br>HOST 8 | 30<br>30<br>30<br>30 |

NODE MANAGEMENT TABLE (SECOND PROPOSED CONFIGURATION)

*FIG. 32*

| HOST ID | OPERATION PERFORMANCE (IOPS) | REQUESTED PERFORMANCE (IOPS) | COUPLED NODE |
|---|---|---|---|
| HOST 1 | 350 | 350 | NODE 1 DIRECT |
| HOST 2 | 350 | 350 | NODE 2 DIRECT |
| HOST 3 | 150 | 150 | INDIRECT |
| HOST 4 | 150 | 150 | INDIRECT |
| HOST 5 | - | 350 | NODE 3 DIRECT |
| HOST 6 | - | 350 | NODE 4 DIRECT |
| HOST 7 | - | 150 | INDIRECT |
| HOST 8 | - | 150 | INDIRECT |

HOST MANAGEMENT TABLE (THIRD PROPOSED CONFIGURATION)

FIG. 33

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| NODE 1 | TYPE A | 500 | 450 | HOST 1 | 350 | HOST 3<br>HOST 4<br>HOST 7<br>HOST 8 | 25<br>25<br>25<br>25 |
| NODE 2 | TYPE A | 500 | 450 | HOST 2 | 350 | HOST 3<br>HOST 4<br>HOST 7<br>HOST 8 | 25<br>25<br>25<br>25 |
| NODE 3 | TYPE A | 500 | 450 | HOST 5 | 350 | HOST 3<br>HOST 4<br>HOST 7<br>HOST 8 | 25<br>25<br>25<br>25 |
| NODE 4 | TYPE A | 500 | 450 | HOST 6 | 350 | HOST 3<br>HOST 4<br>HOST 7<br>HOST 8 | 25<br>25<br>25<br>25 |
| NODE 5 | TYPE A | 500 | 100 | - | - | HOST 3<br>HOST 4<br>HOST 7<br>HOST 8 | 25<br>25<br>25<br>25 |
| NODE 6 | TYPE A | 500 | 100 | - | - | HOST 3<br>HOST 4<br>HOST 7<br>HOST 8 | 25<br>25<br>25<br>25 |

NODE MANAGEMENT TABLE (THIRD PROPOSED CONFIGURATION)

FIG. 34

| HOST ID | OPERATION PERFORMANCE (IOPS) | REQUESTED PERFORMANCE (IOPS) | COUPLED NODE |
|---|---|---|---|
| HOST 1 | 350 | 350 | ~~NODE 1 DIRECT~~ |
| HOST 2 | 350 | 350 | NODE 2 DIRECT |
| HOST 3 | 150 | 150 | INDIRECT |
| HOST 4 | 150 | 150 | INDIRECT |
| HOST 5 | - | 350 | NODE 3 DIRECT |
| HOST 6 | - | 350 | NODE 4 DIRECT |
| HOST 7 | - | 150 | INDIRECT |
| HOST 8 | - | 150 | INDIRECT |

NODE-FAILURE HOST MANAGEMENT TABLE
(FIRST PROPOSED CONFIGURATION)

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| NODE 1 | TYPE A | 500 | 500 | HOST 1 | 350 | HOST 3<br>HOST 4<br>HOST 7<br>HOST 8 | 37.5<br>37.5<br>37.5<br>37.5 |
| NODE 2 | TYPE A | 500 | 500 | HOST 2 | 350 | HOST 3<br>HOST 4<br>HOST 7<br>HOST 8 | 37.5<br>37.5<br>37.5<br>37.5 |
| NODE 3 | TYPE A | 500 | 500 | HOST 5 | 350 | HOST 3<br>HOST 4<br>HOST 7<br>HOST 8 | 37.5<br>37.5<br>37.5<br>37.5 |
| NODE 4 | TYPE A | 500 | 500 | HOST 6 | 350 | HOST 3<br>HOST 4<br>HOST 7<br>HOST 8 | 37.5<br>37.5<br>37.5<br>37.5 |

NODE-FAILURE NODE MANAGEMENT TABLE (FIRST PROPOSED CONFIGURATION)

*FIG. 36*

| HOST ID | OPERATION PERFORMANCE (IOPS) | REQUESTED PERFORMANCE (IOPS) | COUPLED NODE |
|---|---|---|---|
| HOST 1 | 350 | 350 | NODE 5 DIRECT |
| HOST 2 | 350 | 350 | NODE 2 DIRECT |
| HOST 3 | 150 | 150 | INDIRECT |
| HOST 4 | 150 | 150 | INDIRECT |
| HOST 5 | - | 350 | NODE 3 DIRECT |
| HOST 6 | - | 350 | NODE 4 DIRECT |
| HOST 7 | - | 150 | INDIRECT |
| HOST 8 | - | 150 | INDIRECT |

NODE-FAILURE HOST MANAGEMENT TABLE
(SECOND PROPOSED CONFIGURATION)

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| NODE 1 | TYPE A | 500 | 470 | HOST 1 | 350 | HOST 3<br>HOST 4<br>HOST 7<br>HOST 8 | 30<br>30<br>30<br>30 |
| NODE 2 | TYPE A | 500 | 500 | HOST 2 | 350 | HOST 3<br>HOST 4<br>HOST 7<br>HOST 8 | 37.5<br>37.5<br>37.5<br>37.5 |
| NODE 3 | TYPE A | 500 | 500 | HOST 5 | 350 | HOST 3<br>HOST 4<br>HOST 7<br>HOST 8 | 37.5<br>37.5<br>37.5<br>37.5 |
| NODE 4 | TYPE A | 500 | 500 | HOST 6 | 350 | HOST 3<br>HOST 4<br>HOST 7<br>HOST 8 | 37.5<br>37.5<br>37.5<br>37.5 |
| NODE 5 | TYPE A | 500 | 500 | HOST 1 | 350 | HOST 3<br>HOST 4<br>HOST 7<br>HOST 8 | 37.5<br>37.5<br>37.5<br>37.5 |

NODE-FAILURE NODE MANAGEMENT TABLE (SECOND PROPOSED CONFIGURATION)

*FIG. 38*

| HOST ID | OPERATION PERFORMANCE (IOPS) | REQUESTED PERFORMANCE (IOPS) | COUPLED NODE |
|---|---|---|---|
| HOST 1 | 350 | 350 | NODE 5 DIRECT |
| HOST 2 | 350 | 350 | NODE 2 DIRECT |
| HOST 3 | 150 | 150 | INDIRECT |
| HOST 4 | 150 | 150 | INDIRECT |
| HOST 5 | - | 350 | NODE 3 DIRECT |
| HOST 6 | - | 350 | NODE 4 DIRECT |
| HOST 7 | - | 150 | INDIRECT |
| HOST 8 | - | 150 | INDIRECT |

NODE-FAILURE HOST MANAGEMENT TABLE
(THIRD PROPOSED CONFIGURATION)

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| NODE 1 | TYPE A | 500 | 450 | HOST 1 | 350 | HOST 3<br>HOST 4<br>HOST 7<br>HOST 8 | 25<br>25<br>25<br>25 |
| NODE 2 | TYPE A | 500 | 470 | HOST 2 | 350 | HOST 3<br>HOST 4<br>HOST 7<br>HOST 8 | 30<br>30<br>30<br>30 |
| NODE 3 | TYPE A | 500 | 470 | HOST 5 | 350 | HOST 3<br>HOST 4<br>HOST 7<br>HOST 8 | 30<br>30<br>30<br>30 |
| NODE 4 | TYPE A | 500 | 470 | HOST 6 | 350 | HOST 3<br>HOST 4<br>HOST 7<br>HOST 8 | 30<br>30<br>30<br>30 |
| NODE 5 | TYPE A | 500 | 470 | HOST 1 | 350 | HOST 3<br>HOST 4<br>HOST 7<br>HOST 8 | 30<br>30<br>30<br>30 |
| NODE 6 | TYPE A | 500 | 120 | - | - | HOST 3<br>HOST 4<br>HOST 7<br>HOST 8 | 30<br>30<br>30<br>30 |

NODE-FAILURE NODE MANAGEMENT TABLE (THIRD PROPOSED CONFIGURATION)

FIG. 40

| PROPOSED CONFIGURATION | ADDITIONAL COST (M¥) | CAPACITY (TB) | PERFORMANCE LIMIT (IOPS) | REDUNDANCY |
|---|---|---|---|---|
| SECOND PROPOSED CONFIGURATION | 2 | 500 | 2500 | 1 NG NODE |
| THIRD PROPOSED CONFIGURATION | 3 | 600 | 3000 | 2 NG NODES |

PROPOSED CONFIGURATION LIST

FIG. 41

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| NODE 1 | TYPE A | 500 | 470 | HOST 1 | 350 | HOST 3<br>HOST 4<br>HOST 7<br>HOST 8 | 30<br>30<br>30<br>30 |
| NODE 2 | TYPE A | 500 | 470 | HOST 2 | 350 | HOST 3<br>HOST 4<br>HOST 7<br>HOST 8 | 30<br>30<br>30<br>30 |
| NODE 3 | TYPE A | 500 | 470 | HOST 5 | 350 | HOST 3<br>HOST 4<br>HOST 7<br>HOST 8 | 30<br>30<br>30<br>30 |
| NODE 4 | TYPE A | 500 | 470 | HOST 6 | 350 | HOST 3<br>HOST 4<br>HOST 7<br>HOST 8 | 30<br>30<br>30<br>30 |
| NODE 5 | TYPE A | 500 | 120 | - | - | HOST 3<br>HOST 4<br>HOST 7<br>HOST 8 | 30<br>30<br>30<br>30 |

DETAILED SECOND PROPOSED CONFIGURATION

*FIG. 42*

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| NODE 1 | TYPE A | 500 | 450 | HOST 1 | 350 | HOST 3<br>HOST 4<br>HOST 7<br>HOST 8 | 25<br>25<br>25<br>25 |
| NODE 2 | TYPE A | 500 | 450 | HOST 2 | 350 | HOST 3<br>HOST 4<br>HOST 7<br>HOST 8 | 25<br>25<br>25<br>25 |
| NODE 3 | TYPE A | 500 | 450 | HOST 5 | 350 | HOST 3<br>HOST 4<br>HOST 7<br>HOST 8 | 25<br>25<br>25<br>25 |
| NODE 4 | TYPE A | 500 | 450 | HOST 6 | 350 | HOST 3<br>HOST 4<br>HOST 7<br>HOST 8 | 25<br>25<br>25<br>25 |
| NODE 5 | TYPE A | 500 | 100 | - | - | HOST 3<br>HOST 4<br>HOST 7<br>HOST 8 | 25<br>25<br>25<br>25 |
| NODE 6 | TYPE A | 500 | 100 | - | - | HOST 3<br>HOST 4<br>HOST 7<br>HOST 8 | 25<br>25<br>25<br>25 |

815

DETAILED THIRD PROPOSED CONFIGURATION

| NODE ID | NODE TYPE | DIRECT PERFORMANCE LIMIT (IOPS) | INDIRECT PERFORMANCE LIMIT (IOPS) |
|---|---|---|---|
| NODE 1 | TYPE A | 500 | 50 |
| NODE 2 | TYPE A | 500 | 50 |
| NODE 3 | TYPE A | 500 | 50 |
| NODE 4 | TYPE B | 1000 | 100 |

PROPOSED CONFIGURATION TABLE (FIRST PROPOSED CONFIGURATION)

| NODE ID | NODE TYPE | DIRECT PERFORMANCE LIMIT (IOPS) | INDIRECT PERFORMANCE LIMIT (IOPS) |
|---|---|---|---|
| NODE 1 | TYPE A | 500 | 50 |
| NODE 2 | TYPE A | 500 | 50 |
| NODE 3 | TYPE A | 500 | 50 |
| NODE 4 | TYPE B | 1000 | 100 |
| NODE 5 | TYPE B | 1000 | 100 |

PROPOSED CONFIGURATION TABLE (SECOND PROPOSED CONFIGURATION)

| NODE ID | NODE TYPE | DIRECT PERFORMANCE LIMIT (IOPS) | INDIRECT PERFORMANCE LIMIT (IOPS) |
|---|---|---|---|
| NODE 1 | TYPE A | 500 | 50 |
| NODE 2 | TYPE A | 500 | 50 |
| NODE 3 | TYPE A | 500 | 50 |
| NODE 4 | TYPE B | 1000 | 100 |
| NODE 5 | TYPE B | 1000 | 100 |
| NODE 6 | TYPE B | 1000 | 100 |

PROPOSED CONFIGURATION TABLE (THIRD PROPOSED CONFIGURATION)

FIG. 46

| HOST ID | OPERATION PERFORMANCE (IOPS) | REQUESTED PERFORMANCE (IOPS) | COUPLED NODE |
|---|---|---|---|
| HOST 1 | 350 | 350 | NODE 1 DIRECT |
| HOST 2 | 350 | 350 | NODE 2 DIRECT |
| HOST 3 | 150 | 150 | INDIRECT |
| HOST 4 | 150 | 150 | INDIRECT |
| HOST 5 | - | 350 | NODE 3 DIRECT |
| HOST 6 | - | 350 | NODE 4 DIRECT |
| HOST 7 | - | 150 | INDIRECT |
| HOST 8 | - | 150 | INDIRECT |

NODE-FAILURE HOST MANAGEMENT TABLE
(FIRST PROPOSED CONFIGURATION)

FIG. 47

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| NODE 1 | TYPE A | 500 | 500 | HOST 1 | 350 | HOST 3<br>HOST 4<br>HOST 7<br>HOST 8 | 37.5<br>37.5<br>37.5<br>37.5 |
| NODE 2 | TYPE A | 500 | 500 | HOST 2 | 350 | HOST 3<br>HOST 4<br>HOST 7<br>HOST 8 | 37.5<br>37.5<br>37.5<br>37.5 |
| NODE 3 | TYPE A | 500 | 500 | HOST 5 | 350 | HOST 3<br>HOST 4<br>HOST 7<br>HOST 8 | 37.5<br>37.5<br>37.5<br>37.5 |
| NODE 4 | TYPE B | 1000 | 500 | HOST 6 | 350 | HOST 3<br>HOST 4<br>HOST 7<br>HOST 8 | 37.5<br>37.5<br>37.5<br>37.5 |

NODE-FAILURE NODE MANAGEMENT TABLE (FIRST PROPOSED CONFIGURATION)

*FIG. 48*

| HOST ID | OPERATION PERFORMANCE (IOPS) | REQUESTED PERFORMANCE (IOPS) | COUPLED NODE |
|---|---|---|---|
| HOST 1 | 350 | 350 | NODE 1 DIRECT |
| HOST 2 | 350 | 350 | NODE 2 DIRECT |
| HOST 3 | 150 | 150 | INDIRECT |
| HOST 4 | 150 | 150 | INDIRECT |
| HOST 5 | - | 350 | NODE 3 DIRECT |
| HOST 6 | - | 350 | NODE 4 DIRECT |
| HOST 7 | - | 150 | INDIRECT |
| HOST 8 | - | 150 | INDIRECT |

NODE-FAILURE HOST MANAGEMENT TABLE
(SECOND PROPOSED CONFIGURATION)

FIG. 49

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| NODE 1 | TYPE A | 500 | 470 | HOST 1 | 350 | HOST 3<br>HOST 4<br>HOST 7<br>HOST 8 | 30<br>30<br>30<br>30 |
| NODE 2 | TYPE A | 500 | 470 | HOST 2 | 350 | HOST 3<br>HOST 4<br>HOST 7<br>HOST 8 | 30<br>30<br>30<br>30 |
| NODE 3 | TYPE A | 500 | 470 | HOST 5 | 350 | HOST 3<br>HOST 4<br>HOST 7<br>HOST 8 | 30<br>30<br>30<br>30 |
| NODE 4 | TYPE B | 1000 | 470 | HOST 6 | 350 | HOST 3<br>HOST 4<br>HOST 7<br>HOST 8 | 30<br>30<br>30<br>30 |
| NODE 5 | TYPE B | 1000 | 120 | - | - | HOST 3<br>HOST 4<br>HOST 7<br>HOST 8 | 30<br>30<br>30<br>30 |

↙ 634

NODE-FAILURE NODE MANAGEMENT TABLE (SECOND PROPOSED CONFIGURATION)

*FIG. 50*

| HOST ID | OPERATION PERFORMANCE (IOPS) | REQUESTED PERFORMANCE (IOPS) | COUPLED NODE |
|---|---|---|---|
| HOST 1 | 350 | 350 | NODE 1 DIRECT |
| HOST 2 | 350 | 350 | NODE 2 DIRECT |
| HOST 3 | 150 | 150 | INDIRECT |
| HOST 4 | 150 | 150 | INDIRECT |
| HOST 5 | - | 350 | NODE 3 DIRECT |
| HOST 6 | - | 350 | NODE 4 DIRECT |
| HOST 7 | - | 150 | INDIRECT |
| HOST 8 | - | 150 | INDIRECT |

NODE-FAILURE HOST MANAGEMENT TABLE
(THIRD PROPOSED CONFIGURATION)

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| NODE 1 | TYPE A | 500 | 450 | HOST 1 | 350 | HOST 3<br>HOST 4<br>HOST 7<br>HOST 8 | 25<br>25<br>25<br>25 |
| NODE 2 | TYPE A | 500 | 450 | HOST 2 | 350 | HOST 3<br>HOST 4<br>HOST 7<br>HOST 8 | 25<br>25<br>25<br>25 |
| NODE 3 | TYPE A | 500 | 450 | HOST 5 | 350 | HOST 3<br>HOST 4<br>HOST 7<br>HOST 8 | 25<br>25<br>25<br>25 |
| NODE 4 | TYPE B | 1000 | 450 | HOST 6 | 350 | HOST 3<br>HOST 4<br>HOST 7<br>HOST 8 | 25<br>25<br>25<br>25 |
| NODE 5 | TYPE B | 1000 | 100 | - | - | HOST 3<br>HOST 4<br>HOST 7<br>HOST 8 | 25<br>25<br>25<br>25 |
| NODE 6 | TYPE B | 1000 | 100 | - | - | HOST 3<br>HOST 4<br>HOST 7<br>HOST 8 | 25<br>25<br>25<br>25 |

NODE-FAILURE NODE MANAGEMENT TABLE (THIRD PROPOSED CONFIGURATION)

| HOST ID | OPERATION PERFORMANCE (IOPS) | REQUESTED PERFORMANCE (IOPS) | COUPLED NODE |
|---|---|---|---|
| HOST 1 | 350 | 350 | NODE 4 DIRECT |
| HOST 2 | 350 | 350 | NODE 2 DIRECT |
| HOST 3 | 150 | 150 | INDIRECT |
| HOST 4 | 150 | 150 | INDIRECT |
| HOST 5 | - | 350 | NODE 3 DIRECT |
| HOST 6 | - | 350 | NODE 4 DIRECT |
| HOST 7 | - | 150 | INDIRECT |
| HOST 8 | - | 150 | INDIRECT |

NODE-FAILURE HOST MANAGEMENT TABLE
(FIRST PROPOSED CONFIGURATION)

FIG. 53

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| NODE 1 | TYPE A | 500 | 500 | HOST 1 | 350 | HOST 3<br>HOST 4<br>HOST 7<br>HOST 8 | 37.5<br>37.5<br>37.5<br>37.5 |
| NODE 2 | TYPE A | 500 | 500 | HOST 2 | 350 | HOST 3<br>HOST 4<br>HOST 7<br>HOST 8 | 37.5<br>37.5<br>37.5<br>37.5 |
| NODE 3 | TYPE A | 500 | 500 | HOST 5 | 350 | HOST 3<br>HOST 4<br>HOST 7<br>HOST 8 | 37.5<br>37.5<br>37.5<br>37.5 |
| NODE 4 | TYPE B | 1000 | 1000 | HOST 6<br>HOST 1 | 700 | HOST 3<br>HOST 4<br>HOST 7<br>HOST 8 | 75<br>75<br>75<br>75 |

652

NODE-FAILURE NODE MANAGEMENT TABLE (FIRST PROPOSED CONFIGURATION)

*FIG. 54*

| HOST ID | OPERATION PERFORMANCE (IOPS) | REQUESTED PERFORMANCE (IOPS) | COUPLED NODE |
|---|---|---|---|
| HOST 1 | 350 | 350 | NODE 5 DIRECT |
| HOST 2 | 350 | 350 | NODE 2 DIRECT |
| HOST 3 | 150 | 150 | INDIRECT |
| HOST 4 | 150 | 150 | INDIRECT |
| HOST 5 | - | 350 | NODE 3 DIRECT |
| HOST 6 | - | 350 | NODE 4 DIRECT |
| HOST 7 | - | 150 | INDIRECT |
| HOST 8 | - | 150 | INDIRECT |

NODE-FAILURE HOST MANAGEMENT TABLE
(SECOND PROPOSED CONFIGURATION)

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| ~~NODE 1~~ | ~~TYPE A~~ | ~~500~~ | ~~470~~ | ~~HOST 1~~ | ~~350~~ | ~~HOST 3~~<br>~~HOST 4~~<br>~~HOST 7~~<br>~~HOST 8~~ | ~~30~~<br>~~30~~<br>~~30~~<br>~~30~~ |
| NODE 2 | TYPE A | 500 | 500 | HOST 2 | 350 | HOST 3<br>HOST 4<br>HOST 7<br>HOST 8 | 37.5<br>37.5<br>37.5<br>37.5 |
| NODE 3 | TYPE A | 500 | 500 | HOST 5 | 350 | HOST 3<br>HOST 4<br>HOST 7<br>HOST 8 | 37.5<br>37.5<br>37.5<br>37.5 |
| NODE 4 | TYPE B | 1000 | 500 | HOST 6 | 350 | HOST 3<br>HOST 4<br>HOST 7<br>HOST 8 | 37.5<br>37.5<br>37.5<br>37.5 |
| NODE 5 | TYPE B | 1000 | 500 | HOST 1 | 350 | HOST 3<br>HOST 4<br>HOST 7<br>HOST 8 | 37.5<br>37.5<br>37.5<br>37.5 |

NODE-FAILURE NODE MANAGEMENT TABLE (SECOND PROPOSED CONFIGURATION)

*FIG. 56*

| HOST ID | OPERATION PERFORMANCE (IOPS) | REQUESTED PERFORMANCE (IOPS) | COUPLED NODE |
|---|---|---|---|
| HOST 1 | 350 | 350 | NODE 5 DIRECT |
| HOST 2 | 350 | 350 | NODE 2 DIRECT |
| HOST 3 | 150 | 150 | INDIRECT |
| HOST 4 | 150 | 150 | INDIRECT |
| HOST 5 | - | 350 | NODE 3 DIRECT |
| HOST 6 | - | 350 | NODE 5 DIRECT |
| HOST 7 | - | 150 | INDIRECT |
| HOST 8 | - | 150 | INDIRECT |

NODE-FAILURE HOST MANAGEMENT TABLE
(SECOND PROPOSED CONFIGURATION)

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| NODE 1 | TYPE A | 500 | 470 | HOST 1 | 350 | HOST 3<br>HOST 4<br>HOST 7<br>HOST 8 | 30<br>30<br>30<br>30 |
| NODE 2 | TYPE A | 500 | 500 | HOST 2 | 350 | HOST 3<br>HOST 4<br>HOST 7<br>HOST 8 | 37.5<br>37.5<br>37.5<br>37.5 |
| NODE 3 | TYPE A | 500 | 500 | HOST 5 | 350 | HOST 3<br>HOST 4<br>HOST 7<br>HOST 8 | 37.5<br>37.5<br>37.5<br>37.5 |
| NODE 4 | TYPE B | 1000 | 500 | HOST 6 | 350 | HOST 3<br>HOST 4<br>HOST 7<br>HOST 8 | 37.5<br>37.5<br>37.5<br>37.5 |
| NODE 5 | TYPE B | 1000 | 1000 | HOST 1<br>HOST 6 | 350<br>350 | HOST 3<br>HOST 4<br>HOST 7<br>HOST 8 | 75<br>75<br>75<br>75 |

NODE-FAILURE NODE MANAGEMENT TABLE (SECOND PROPOSED CONFIGURATION)

*FIG. 58*

| HOST ID | OPERATION PERFORMANCE (IOPS) | REQUESTED PERFORMANCE (IOPS) | COUPLED NODE |
|---|---|---|---|
| HOST 1 | 350 | 350 | NODE 5 DIRECT |
| HOST 2 | 350 | 350 | NODE 2 DIRECT |
| HOST 3 | 150 | 150 | INDIRECT |
| HOST 4 | 150 | 150 | INDIRECT |
| HOST 5 | - | 350 | NODE 3 DIRECT |
| HOST 6 | - | 350 | NODE 4 DIRECT |
| HOST 7 | - | 150 | INDIRECT |
| HOST 8 | - | 150 | INDIRECT |

NODE-FAILURE HOST MANAGEMENT TABLE
(THIRD PROPOSED CONFIGURATION)

FIG. 59

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| ~~NODE 1~~ | ~~TYPE A~~ | ~~500~~ | ~~450~~ | ~~HOST 1~~ | ~~350~~ | ~~HOST 3~~ ~~HOST 4~~ ~~HOST 7~~ ~~HOST 8~~ | ~~25~~ ~~25~~ ~~25~~ ~~25~~ |
| NODE 2 | TYPE A | 500 | 470 | HOST 2 | 350 | HOST 3 HOST 4 HOST 7 HOST 8 | 30 30 30 30 |
| NODE 3 | TYPE A | 500 | 470 | HOST 5 | 350 | HOST 3 HOST 4 HOST 7 HOST 8 | 30 30 30 30 |
| NODE 4 | TYPE A | 500 | 470 | HOST 6 | 350 | HOST 3 HOST 4 HOST 7 HOST 8 | 30 30 30 30 |
| NODE 5 | TYPE B | 1000 | 470 | HOST 1 | 350 | HOST 3 HOST 4 HOST 7 HOST 8 | 30 30 30 30 |
| NODE 6 | TYPE B | 1000 | 120 | - | - | HOST 3 HOST 4 HOST 7 HOST 8 | 30 30 30 30 |

NODE-FAILURE NODE MANAGEMENT TABLE (THIRD PROPOSED CONFIGURATION)

FIG. 60

| HOST ID | OPERATION PERFORMANCE (IOPS) | REQUESTED PERFORMANCE (IOPS) | COUPLED NODE |
|---|---|---|---|
| HOST 1 | 350 | 350 | NODE 5 DIRECT |
| HOST 2 | 350 | 350 | NODE 6 DIRECT |
| HOST 3 | 150 | 150 | INDIRECT |
| HOST 4 | 150 | 150 | INDIRECT |
| HOST 5 | - | 350 | NODE 3 DIRECT |
| HOST 6 | - | 350 | NODE 4 DIRECT |
| HOST 7 | - | 150 | INDIRECT |
| HOST 8 | - | 150 | INDIRECT |

NODE-FAILURE HOST MANAGEMENT TABLE
(THIRD PROPOSED CONFIGURATION)

NODE-FAILURE NODE MANAGEMENT TABLE (THIRD PROPOSED CONFIGURATION) ~ 660

| NODE ID | NODE TYPE | PERFORMANCE LIMIT (IOPS) | REQUESTED PERFORMANCE TOTAL VALUE (IOPS) | DIRECT COUPLING HOST ID | DIRECT COUPLING REQUESTED PERFORMANCE (IOPS) | INDIRECT COUPLING HOST ID | INDIRECT COUPLING REQUESTED PERFORMANCE (IOPS) |
|---|---|---|---|---|---|---|---|
| ~~NODE 1~~ | ~~TYPE A~~ | ~~500~~ | ~~450~~ | ~~HOST 1~~ | ~~350~~ | ~~HOST 3~~ ~~HOST 4~~ ~~HOST 7~~ ~~HOST 8~~ | ~~25~~ ~~25~~ ~~25~~ ~~25~~ |
| ~~NODE 2~~ | ~~TYPE A~~ | ~~500~~ | ~~470~~ | ~~HOST 2~~ | ~~350~~ | ~~HOST 3~~ ~~HOST 4~~ ~~HOST 7~~ ~~HOST 8~~ | ~~30~~ ~~30~~ ~~30~~ ~~30~~ |
| NODE 3 | TYPE A | 500 | 500 | HOST 5 | 350 | HOST 3 HOST 4 HOST 7 HOST 8 | 37.5 37.5 37.5 37.5 |
| NODE 4 | TYPE A | 500 | 500 | HOST 6 | 350 | HOST 3 HOST 4 HOST 7 HOST 8 | 37.5 37.5 37.5 37.5 |
| NODE 5 | TYPE A | 1000 | 500 | HOST 1 | 350 | HOST 3 HOST 4 HOST 7 HOST 8 | 37.5 37.5 37.5 37.5 |
| NODE 6 | TYPE A | 1000 | 500 | HOST 2 | 350 | HOST 3 HOST 4 HOST 7 HOST 8 | 37.5 37.5 37.5 37.5 |

| PROPOSED CONFIGURATION | ADDITIONAL COST (M¥) | CAPACITY (TB) | PERFORMANCE LIMIT (IOPS) | REDUNDANCY |
|---|---|---|---|---|
| SECOND PROPOSED CONFIGURATION | 4 | 700 | 3500 | 1 NG NODE |
| THIRD PROPOSED CONFIGURATION | 6 | 800 | 4500 | 2 NG NODES |

PROPOSED CONFIGURATION LIST

FIG. 63

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| NODE 1 | TYPE A | 500 | 470 | HOST 1 | 350 | HOST 3<br>HOST 4<br>HOST 7<br>HOST 8 | 30<br>30<br>30<br>30 |
| NODE 2 | TYPE A | 500 | 470 | HOST 2 | 350 | HOST 3<br>HOST 4<br>HOST 7<br>HOST 8 | 30<br>30<br>30<br>30 |
| NODE 3 | TYPE A | 500 | 470 | HOST 5 | 350 | HOST 3<br>HOST 4<br>HOST 7<br>HOST 8 | 30<br>30<br>30<br>30 |
| NODE 4 | TYPE B | 1000 | 470 | HOST 6 | 350 | HOST 3<br>HOST 4<br>HOST 7<br>HOST 8 | 30<br>30<br>30<br>30 |
| NODE 5 | TYPE B | 1000 | 120 | - | - | HOST 3<br>HOST 4<br>HOST 7<br>HOST 8 | 30<br>30<br>30<br>30 |

DETAILED SECOND PROPOSED CONFIGURATION

*FIG. 64*

| NODE ID | NODE TYPE | PERFORMANCE LIMIT (IOPS) | REQUESTED PERFORMANCE TOTAL VALUE (IOPS) | DIRECT COUPLING | | INDIRECT COUPLING | |
|---|---|---|---|---|---|---|---|
| | | | | HOST ID | REQUESTED PERFORMANCE (IOPS) | HOST ID | REQUESTED PERFORMANCE (IOPS) |
| NODE 1 | TYPE A | 500 | 450 | HOST 1 | 350 | HOST 3<br>HOST 4<br>HOST 7<br>HOST 8 | 25<br>25<br>25<br>25 |
| NODE 2 | TYPE A | 500 | 450 | HOST 2 | 350 | HOST 3<br>HOST 4<br>HOST 7<br>HOST 8 | 25<br>25<br>25<br>25 |
| NODE 3 | TYPE A | 500 | 450 | HOST 5 | 350 | HOST 3<br>HOST 4<br>HOST 7<br>HOST 8 | 25<br>25<br>25<br>25 |
| NODE 4 | TYPE B | 1000 | 450 | HOST 6 | 350 | HOST 3<br>HOST 4<br>HOST 7<br>HOST 8 | 25<br>25<br>25<br>25 |
| NODE 5 | TYPE B | 1000 | 100 | - | - | HOST 3<br>HOST 4<br>HOST 7<br>HOST 8 | 25<br>25<br>25<br>25 |
| NODE 6 | TYPE B | 1000 | 100 | - | - | HOST 3<br>HOST 4<br>HOST 7<br>HOST 8 | 25<br>25<br>25<br>25 |

DETAILED THIRD PROPOSED CONFIGURATION

*FIG. 65*

APPARATUS CONFIGURED TO CREATE EXTENDED CONFIGURATION PROPOSAL OF STORAGE SYSTEM INCLUDING MULTIPLE NOTES

CLAIM OF PRIORITY

The present application claims priority from Japanese patent application JP2019-187377 filed on Oct. 11, 2019, the content of which is hereby incorporated by reference into this application.

BACKGROUND

This disclosure relates to an apparatus configured to create extended configuration proposal of storage system including multiple nodes.

In storage systems, a data capacity is increasing as data required to be stored for a long period of time increases, as data to be duplicated for purposes such as data protection and disaster recovery increases, and along with introduction and extension of virtual servers. Moreover, in the storage systems, the capacity is often increased stepwise, and there are two introduction patterns, which are a new introduction and an extension.

The following related art is known as a background art in this technical field. In JP 2011-39803 A, there is described a capacity management method involving, when belonging to a storage system having a first function is a condition for assigning multiple logical volumes to a host apparatus, searching, by a management apparatus configured to manage multiple storage systems, the multiple storage systems for a storage system having the first function; selecting one or more logical volumes that are included in the retrieved storage systems and are not assigned yet; acquiring a capacity of the logical volumes included in the selected logical volumes; and notifying an output device of the acquired capacity as a capacity that can be assigned to the host apparatus.

Moreover, in JP 2004-334561 A, a storage operation management system having the following configuration is described. Attribute values relating to a requested characteristic, performance, and reliability for each application and a characteristic of a volume defining classifications of levels of attribute values are converted into numerical values, and are registered in a volume management table. A user specifies a type, a performance level, and a reliability level of the application as elements of a policy, to thereby execute volume selection processing. The storage operation management system calculates, from the characteristic values in the volume management table, an upper limit and a lower limit of a level threshold value of the volume to be selected, and presents volumes within the range to the user as assignment candidates. When a change occurs in a storage device forming the system, the volume management table is automatically updated, to thereby enable the setting of the threshold value in accordance with the change in the system configuration and the selection and the assignment of a volume based on the newly set threshold value.

There is known a scale-out storage system, which uses multiple nodes to form a cluster, and adds a node to the cluster, to thereby increase its capacity and performance. In order to execute the scale-out so as to satisfy performance requested by a user, a storage system designer is required to appropriately estimate a required configuration of the storage system from the requested performance.

SUMMARY OF THE INVENTION

However, the storage system having the cluster configuration is formed of multiple nodes, and hence performance that can be provided for the host varies depending on a difference in performance due to hardware specifications of the node and a difference in performance due to an access path from the host to the volume. Therefore, it is impossible to precisely estimate performance required by the storage system in order to satisfy the requested performance, based on a simple sum of the node performance. As a result, a large amount of man-hours and a long period of time are required to precisely estimate a required configuration of the storage system from the requested performance.

An aspect of this disclosure is an apparatus configured to create an extended configuration proposal of a storage system including multiple nodes. The apparatus includes a processor and a storage device configured to store a program to be executed by the processor. The processor is configured to acquire information on requested performance of each host, which accesses the storage system. The processor is configured to acquire information on performance of each of multiple existing nodes of the storage system. The processor is configured to determine a number and performance of one or more additional nodes and a coupling form between the host and the storage system so as to satisfy the requested performance of each host. The processor is configured to include the number and the performance of the one or more additional nodes and the coupling form in the extended configuration proposal.

According to at least one aspect of this disclosure, a required configuration of the storage system for the requested performance can appropriately be proposed. Objects, configurations, and effects other than those described above become apparent from the following description of at least one embodiment of this disclosure.

BRIEF DESCRIPTION OF THE DRAWINGS

FIG. 4 is a table for showing a configuration example of a host requested performance table;

FIG. 5 is a table for showing a configuration example of a configuration monitoring information management table included in the configuration monitoring information;

FIG. 6 is a table for showing a configuration example of an operation monitoring information management table included in the configuration monitoring information;

FIG. 7 is a table for showing a configuration example of a node configuration management table included in the configuration information;

FIG. 8 is a table for showing a configuration example of a coupled node management table included in the configuration information;

FIG. 29 is a host management table of the first proposed configuration;

FIG. 30 is a node management table of the first proposed configuration;

FIG. 31 is a host management table of the second proposed configuration;

FIG. 32 is a node management table of the second proposed configuration;

FIG. 33 is a host management table of the third proposed configuration;

FIG. 34 is a node management table of the third proposed configuration;

FIG. 35 shows a node failure simulation table for the first proposed configuration;

FIG. 36 shows a node failure simulation table for the first proposed configuration;

FIG. 37 shows a node failure simulation table for the second proposed configuration;

FIG. 38 shows a node failure simulation table for the second proposed configuration;

FIG. 39 shows a node failure simulation table for the third proposed configuration;

FIG. 40 shows a node failure simulation table for the third proposed configuration;

FIG. 41 is a table for showing a configuration example of a proposed configuration list that stores information on the proposed configurations that satisfy the user request;

FIG. 42 shows a detailed image of the second proposed configuration;

FIG. 43 shows a detailed image of the third proposed configuration;

FIG. 44 is a proposed configuration table of the first proposed configuration;

FIG. 45 is a proposed configuration table of the second proposed configuration;

FIG. 46 is a proposed configuration table of the third proposed configuration;

FIG. 47 is a host management table of the first proposed configuration;

FIG. 48 is a node management table of the first proposed configuration;

FIG. 49 is a host management table of the second proposed configuration;

FIG. 50 is a node management table of the second proposed configuration;

FIG. 51 is a host management table of the third proposed configuration;

FIG. 52 is a node management table of the third proposed configuration;

FIG. 53 shows a node failure simulation table for the first proposed configuration;

FIG. 54 shows a node failure simulation table for the first proposed configuration;

FIG. 55 shows a node failure simulation table for the second proposed configuration;

FIG. 56 shows a node failure simulation table for the second proposed configuration;

FIG. 57 shows simulation results obtained when a failure further occurs in the node 4 after a failure of the node 1 in the second proposed configuration;

FIG. 58 shows simulation results obtained when the failure further occurs in the node 4 after the failure of the node 1 in the second proposed configuration;

FIG. 59 shows a node failure simulation table for the third proposed configuration;

FIG. 60 shows a node failure simulation table for the third proposed configuration;

FIG. 61 shows simulation results obtained when a failure further occurs in the node 2 after a failure of the node 1 in the third proposed configuration;

FIG. 62 shows simulation results obtained when the failure further occurs in the node 2 after the failure of the node 1 in the third proposed configuration;

FIG. 63 is a table for showing a configuration example of a proposed configuration list that stores information on the proposed configurations that satisfy the user request when the node type B is selected;

FIG. 64 shows a detailed image of the second proposed configuration; and

FIG. 65 shows a detailed image of the third proposed configuration.

DETAILED DESCRIPTION OF EMBODIMENTS

Embodiments of this disclosure are described below with reference to the accompanying drawings. In the following description, a computer system is a system including one or more physical computers. The physical computers may be general computers or dedicated computers. The physical computers may function as computers configured to issue an input/output (I/O) request, or computers configured to execute data I/O in response to an I/O request.

In other words, the computer system may be at least one of a system including one or more computers configured to issue an I/O request and a system including one or more computers configured to execute data I/O in response to an I/O request. On at least one physical computer, one or more virtual computers may be run. The virtual computers may be computers configured to issue an I/O request, or computers configured to execute data I/O in response to an I/O request.

In the following description, some sentences describing processing have "program" as the subject. However, the sentences describing processing may have "processor" (or a controller or similar device that includes a processor) as the subject because a program is executed by a processor to perform prescribed processing while suitably using, for example, a storage unit and/or an interface unit.

A program may be installed in a computer or a similar apparatus from a program source. The program source may be, for example, a program distribution server or a computer-readable (for example, non-transitory) recording medium. In the following description, two or more programs may be implemented as one program, and one program may be implemented as two or more programs.

The following description may use "xxx table" or a similar expression to describe information. The information, however, may be data having any structure. Each table configuration in the following description is an example, and one table may be divided into two or more tables, while all or some of two or more tables may be configured as one table.

Figure 1:
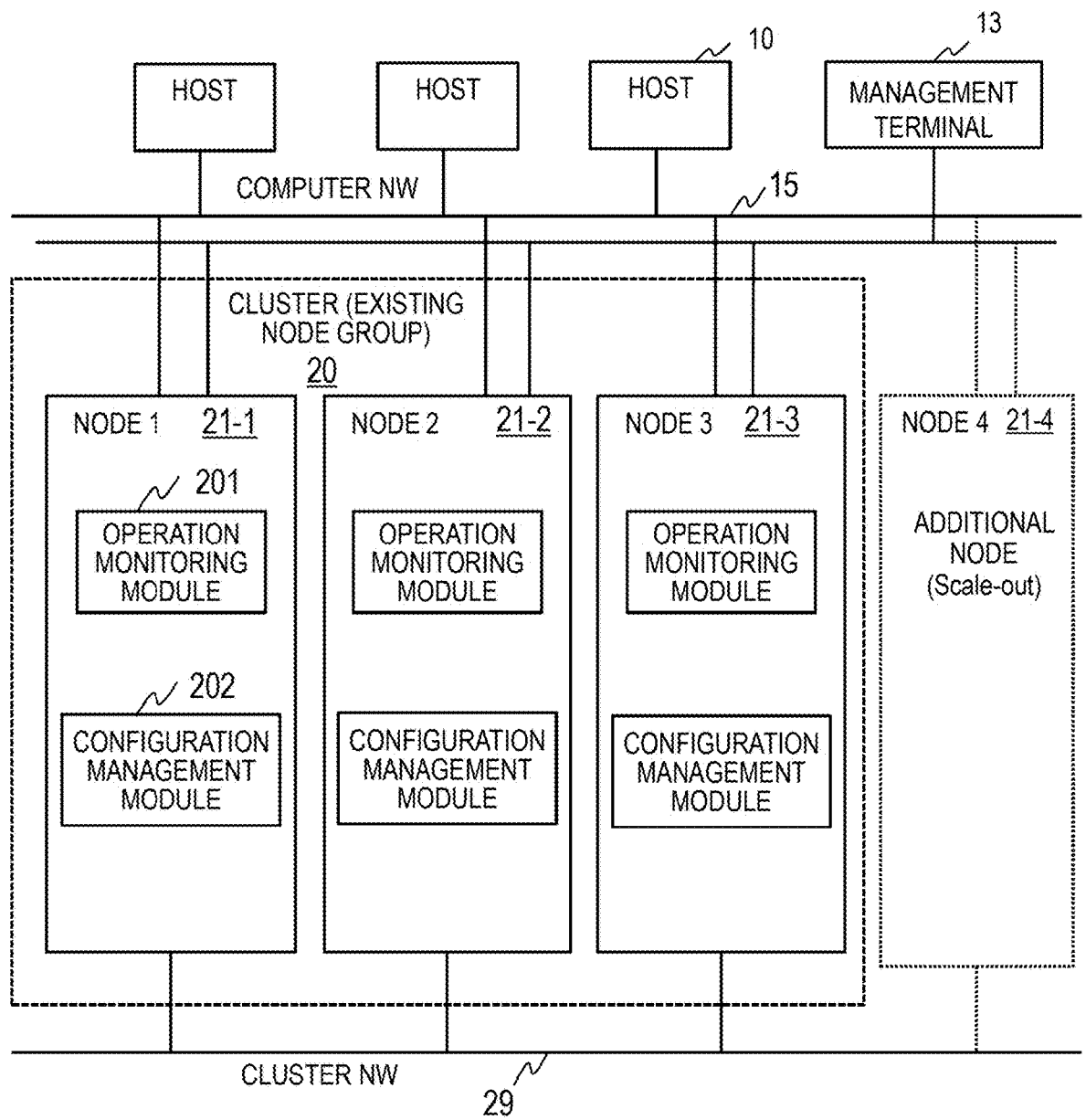
FIG. 1 is a block diagram for schematically illustrating a configuration example of a computer system.

FIG. 1 is a block diagram for schematically illustrating a configuration example of a computer system. The computer system includes one or more hosts 10, a management terminal 13, and a cluster 20. Three hosts 10 are illustrated in FIG. 1 as an example, and one of the three hosts is indicated by the reference symbol 10 as an example. The hosts 10, the management terminal 13, and the cluster 20 can hold communication to and from one another over a calculation network (NW) 15.

The cluster 20 is a distributed storage system including a plurality of storage nodes (hereinafter referred to simply as "node"), and receives I/O from the hosts 10. The cluster 20 stores write data received from the hosts 10 as requested by write requests from the hosts 10. The cluster 20 reads, out of stored data, specified data as requested by read requests from the hosts 10 and returns the read data to the hosts 10. The management terminal 13 is used by an administrator (a user) to manage the computer system.

The cluster 20 is formed of multiple nodes. In the configuration example illustrated in FIG. 1, the cluster 20 is formed of three existing nodes 21-1, 21-2, and 21-3. In the example illustrated in FIG. 1, a node 21-4 is added to the cluster 20 for scale-out of the cluster 20. In the configuration example of FIG. 1, the nodes 21-1 to 21-4 are physical nodes. The nodes 21-1 to 21-4 can communicate to and from one another via a cluster network 29. The calculation network 15 and the cluster network 29 may be formed of one network.

The nodes 21-1 to 21-4 are storage nodes (storage device), and include storage devices configured to store user data from the hosts 10. Each node receives and stores specified user data, or returns specified user data, in accordance with a request from the host 10 or other nodes. When the node stores user data specified by a request received from the host 10 in the own storage device, the node returns the stored data to the host 10.

When the user data specified by the request received from the host 10 is stored in another node, the node that has received the request from the host 10 receives the specified user data from a node that stores the user data through the cluster network 29, and transmits the user data to the host 10 through the calculation network 15.

Each node includes an operation monitoring module 201 and a configuration management module 202. The operation monitoring module 201 and the configuration management module 202 can be implemented by, for example, a processor executing programs. The operation monitoring module 201 monitors the operation state of the node in which the operation monitoring module 201 is included, and transmits monitoring results to the management terminal 13. In an example described below, the operation monitoring module 201 monitors information on current performance of the node. The configuration management module 202 manages and monitors the configuration of the node in which the configuration management module 202 is included, and transmits management information on the node configuration to the management terminal 13. In an example described below, the configuration management module 202 monitors a use amount of the capacity of the node.

Figures 2, 3:
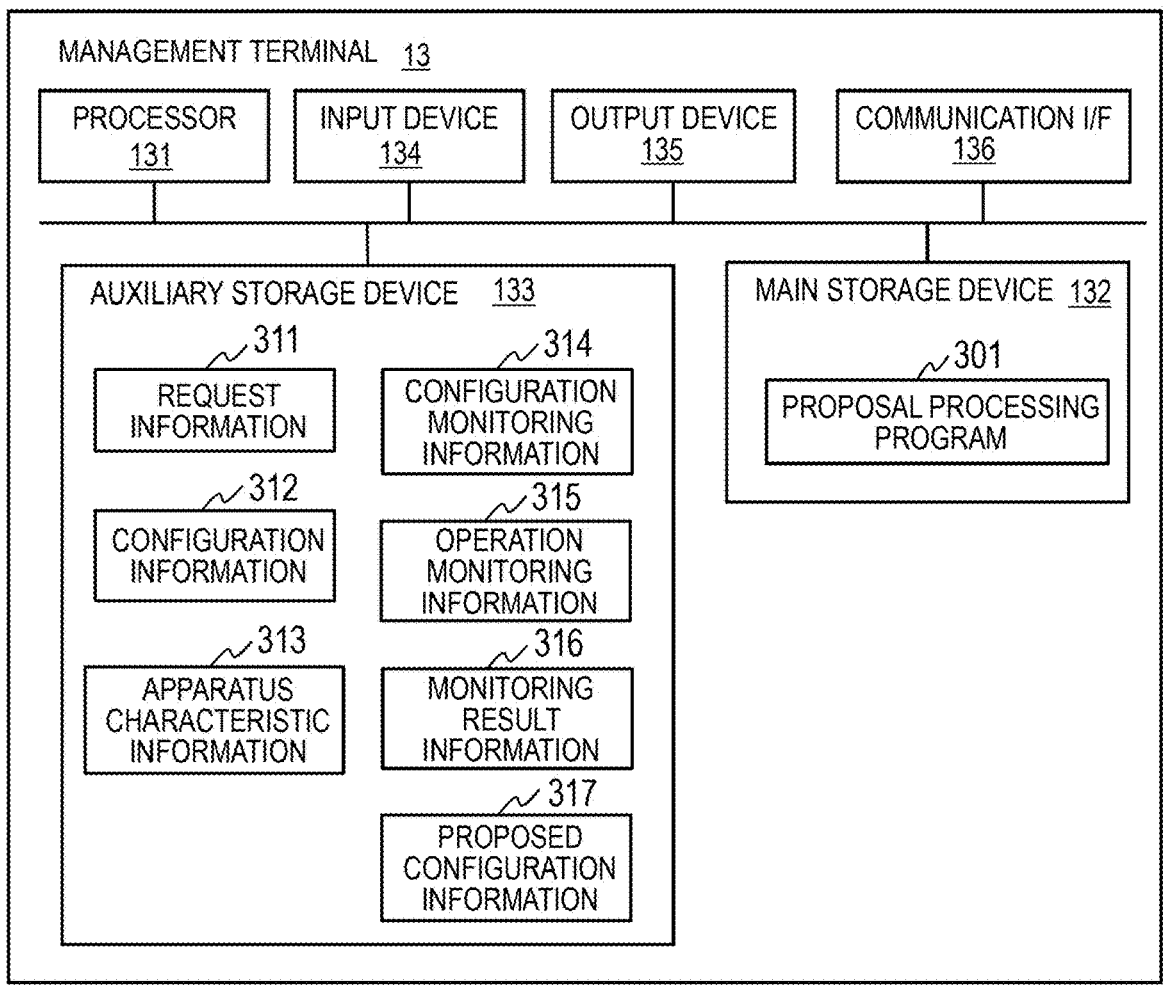
FIG. 2 is a diagram for illustrating a configuration example of the management terminal.
FIG. 3 is a table for showing a configuration example of a request management table.

FIG. 2 is a diagram for illustrating a configuration example of the management terminal 13. The management terminal 13 can have a computer configuration. The management terminal 13 includes a processor 131, a main storage device 132, an auxiliary storage device 133, an input device 134, an output device 135, and a communication interface (I/F) 136. The above-mentioned components are coupled to one another through a bus.

The main storage device 132, the auxiliary storage device 133, or a combination thereof is a storage device including a non-transitory storage medium, and stores a program and data that are used by the processor 131. The main storage device 132 includes, for example, a semiconductor memory, and is used mainly to hold a program being run and data being used. The processor 131 executes various types of processing as programmed by programs stored in the main storage device 132. The processor 131 implements various function modules by operating as programmed by programs.

The auxiliary storage device 133 includes, for example, one or a plurality of hard disk drives, solid-state drives, or other large-capacity storage devices, and is used to keep a program and data for a long period of time.

The processor 131 may be a single processing unit or a plurality of processing units, and may include a single or a plurality of arithmetic units, or a plurality of processing cores. The processor 131 may be implemented as one or a plurality of central processing units, microprocessors, microcomputers, microcontrollers, digital signal processors, state machines, logic circuits, graphic processing apparatus, systems-on-a-chip, and/or freely-selected apparatus that manipulate a signal as instructed by a control instruction.

A program and data that are stored in the auxiliary storage device 133 are loaded, in booting or when required, onto the main storage device 132, and the processor 131 executes the loaded program, to thereby execute various types of processing of the management terminal 13. Processing executed below by the program is accordingly processing by the processor 131 or by the management terminal 13.

The management terminal 13 further includes the input device 134 and the output device 135. The input device 134 is a hardware device to be used by a user to input an instruction and information to the management terminal 13, and is, for example, a keyboard and a mouse. The output device 135 is a hardware device configured to present various images for input and output, and is, for example, a display device and a printer. The communication I/F 136 is an interface for coupling to the calculation network 15. The functions of the management terminal 13 may be implemented in multiple computers capable of communicating to and from one another. The hosts 10 and the nodes 21-1 to 21-4 may have the computer configuration illustrated in FIG. 2, and unnecessary components are omitted.

As illustrated in FIG. 2, the main storage device 132 stores a proposal processing program 301. The proposal processing program 301 is executed by the processor 131. The processor 131 executes the proposal processing program 301, to thereby operate as a proposal processing module. The auxiliary storage device 133 stores request information 311, configuration information 312, apparatus characteristic information 313, configuration monitoring information 314, operation monitoring information 315, monitoring result information 316, and proposed configuration information 317. In FIG. 2, the various types of information are illustrated in the auxiliary storage device 133, and the program 301 is illustrated in the main storage device 132 for the sake of convenience, but the program and the data (information) may be stored in any one of the main storage device 132 and the auxiliary storage device 133, or may be stored in both thereof.

The request information 311 stores information on user quests directed to the storage system (clusters). Specifically, the request information 311 includes a request management table and a host requested performance table.

FIG. 3 is a table for showing a configuration example of a request management table 410. The request management table 410 includes a request ID field 411 and a requested element field 412. Each record (row) stores values associated with those fields. This point applies to other tables. The request ID field 411 indicates an ID of a request received from the user. The requested element field 412 indicates values of requested elements from the user to be satisfied by the storage system. In the example of FIG. 3, the requested elements include cost, capacity, performance, and redundancy of the entire storage system. It should be noted that those elements may not be essential elements of the proposed configuration, and may be referred to, for example, in order to determine priorities of the proposed configurations.

The performance is represented by an input/output per second (IOPS). The redundancy indicates a permissible number of failed nodes within a range in which the storage system can maintain the requested performance of each of the hosts. For example, in a case where the redundancy is two, even when failures occur in two nodes, performance requested from the storage system can be provided, and when failures occur in three or more nodes, the performance requested from the storage system cannot not be provided. A part of the information in the requested element field 412 may be omitted.

FIG. 4 is a table for showing a configuration example of a host requested performance table 420. The host requested performance table 420 stores information on performance of each of the operating hosts, and performance of each of the additional hosts requested by the user. The host requested performance table 420 is associated with one request ID (for example, a request 1). The host requested performance table 420 includes a host ID field 421, an operation performance field 422, and a requested performance field 423. The host ID field 421 indicates an ID of the host that accesses the storage system.

The operation performance field 422 indicates an actual access performance (measured access performance) of the existing host in operation to the storage system. The requested performance field 423 indicates access performance requested by the user to the host to be newly added. In the example shown in FIG. 4, a host 1 to a host 4 are operating hosts, and a host 5 to a host 8 are hosts to be newly added. A sum of the operation performance of the existing hosts and a sum of requested performance of the additional hosts are equal to or less than the performance of the corresponding request in the request management table 410.

FIG. 5 is a table for showing a configuration example of a configuration monitoring information management table 430 included in the configuration monitoring information 314. The configuration monitoring information management table 430 shows monitoring methods for the configuration of the storage system included in user requests. The configuration monitoring information management table 430 includes a configuration monitoring ID field 431, an object-to-be-monitored field 432, a monitoring cycle field 433, and a request ID field 434. The configuration monitoring ID field 431 indicates an ID of a configuration monitoring method.

The object-to-be-monitored field 432 indicates an object to be monitored. In the example of FIG. 5, a "capacity use amount" means the size of an area that is used to store data out of the capacity of the storage system. The monitoring cycle field 433 indicates a cycle for acquiring information on the object to be monitored from the storage system by the management terminal 13. The request ID field 434 indicates the ID of the user request corresponding to each ID of the configuration monitoring ID field 431, and matches the request ID field 411 of the request management table 410.

FIG. 6 is a table for showing a configuration example of an operation monitoring information management table 440 included in the configuration monitoring information 315. The operation monitoring information management table 440 shows monitoring methods for the operation state of the storage system included in the user requests. Specifically, the performance of the respective operating (existing) hosts and nodes is monitored.

The operation monitoring information management table 440 includes an operation monitoring ID field 441, a monitoring time slot field 442, and a request ID field 443. The operation monitoring ID field 441 indicates an ID of a monitoring method for the operation state. The monitoring time slot field 442 indicates a time slot in which the performance of the hosts and the nodes are to be monitored. The performance monitored in the time slot indicated by the monitoring time slot field 442 is acquired as monitoring results. The request ID field 443 indicates the ID of the user request corresponding to each ID of the operation monitoring ID field 441, and matches the request ID field 411 of the request management table 410.

The configuration information 312 is information on the configuration of the storage system, and is, for example, set by the user, or the proposal processing program 301 acquires the information on the configuration from the configuration management module 202 of the storage system.

FIG. 7 is a table for showing a configuration example of a node configuration management table 450 included in the configuration information 312. The node configuration management table 450 manages information on a configuration of the existing nodes of the cluster. The node configuration management table 450 includes a node ID field 451 and a node type field 452. The node ID field 451 indicates an ID of the existing node of the cluster. The node type field 452 indicates a node type of each existing node.

FIG. 8 is a table for showing a configuration example of a coupled node management table 455 included in the configuration information 312. The coupled node management table 455 indicates access methods and access destination nodes (coupling forms) of the existing hosts to the storage system. Specifically, the coupled node management table 455 includes a host ID field 456 and a coupled node field 457. The coupled node field 457 indicates an access method and an access destination node of each host. Any one of a "direct access" and an "indirect access" is assigned to each host.

The "direct access" is an access method in which user data of a host is stored in a node of an access destination from the host. For example, the host accesses a logical volume provided by each of one or multiple nodes, and a physical storage area of the node which provides each logical volume is assigned to the logical volume.

The "indirect access" is an access method in which the host can access any node of the storage system and user data of the host can be stored in any node thereof. For example, the storage system defines a pool formed of physical storage areas of all of the nodes. The storage system provides a virtual volume to the host, and assigns a physical storage area to the virtual volume from the pool in accordance with storage of data from the host to the virtual volume.

When a node that is accessed (to which a request was transmitted) by the host to read user data from the virtual volume stores the user data, the accessed node returns the user data stored in the own node to the host. Meanwhile, when the accessed node does not store the user data, transfer of the user data between nodes occurs. The node that has received the request from the host requests another node that stores the specified user data to transfer the user data, and transfers the user data received from the another node to the host. Thus, the performance of the indirect access is lower than the performance of the direct access.

In the example of FIG. 8, for example, the host 1 makes the direct access to the node 1. In other words, the host 1 accesses only the node 1, and the user data of the host 1 is stored in the storage device of the node 1. The operation performance of the host 1 is access performance to the node 1. The host 3 makes the indirect access to the cluster. In other words, the host 3 selects a node to be accessed for each request in accordance with a bus selection algorithm. The operation performance of the host 3 is access performance to the entire cluster.

Figure 9:
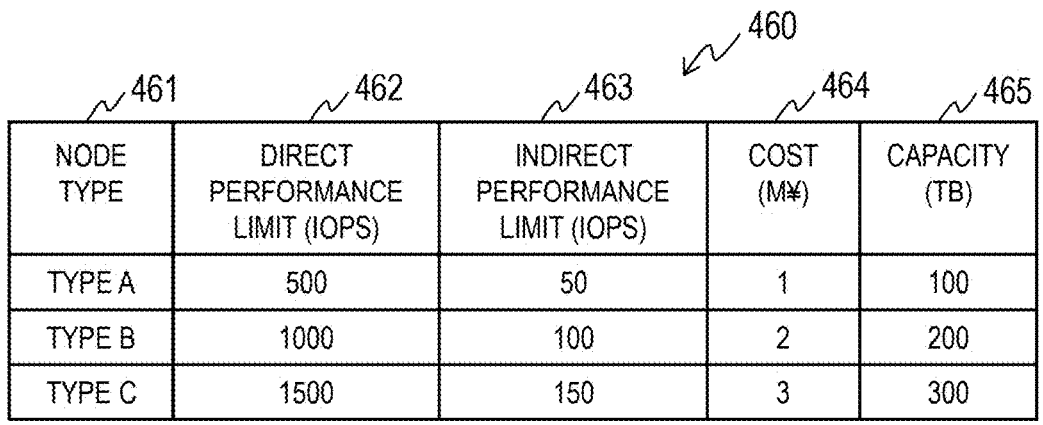
FIG. 9 is a table for showing a configuration example of a node type management table included in the apparatus characteristic information.

FIG. 9 is a table for showing a configuration example of a node type management table 460 included in the apparatus characteristic information 313. The node type management table 460 manages information on node types. The node type management table 460 includes a node type field 461, a direct performance limit field 462, an indirect performance limit field 463, a cost field 464, and a capacity field 465. The node type management table 460 is set in advance.

The node type field 461 indicates the type of a node. The direct performance limit field 462 indicates a direct performance limit of each node type. The direct performance limit is a performance limit of the node for the direct access. The indirect performance limit field 463 indicates an indirect performance limit of each node type. The indirect performance limit is a performance limit of the node for the indirect access. A performance limit for a sum of all of the accesses to the node matches the direct performance limit. The cost field 464 indicates a cost (price) of each node type. The capacity field 465 indices a capacity of each node type.

Figure 10:
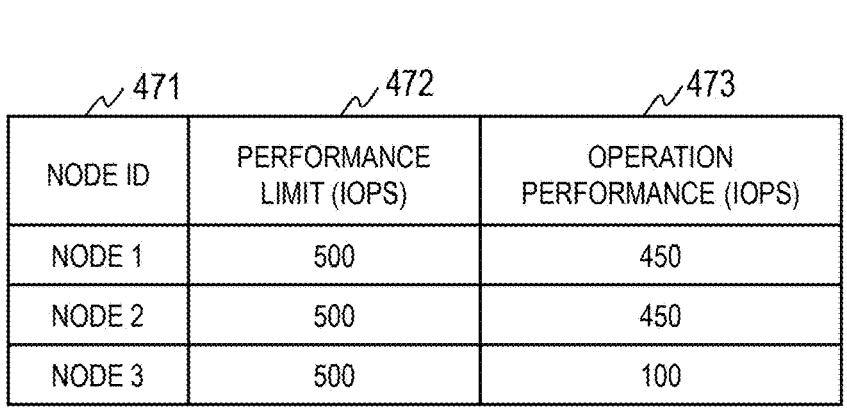
FIG. 10 is a table for showing a configuration example of a node performance management table included in the monitoring result information.

FIG. 10 is a table for showing a configuration example of a node performance management table 470 included in the monitoring result information 316. The node performance management table 470 is associated with a corresponding request ID. The node performance management table 470 manages information on performance of each existing node. Specifically, the node performance management table 470 includes a node ID field 471, a performance limit field 472, and an operation performance field 473.

The node ID field 471 indicates an ID of each existing (operating) node. The performance limit field 472 indicates a performance limit of each existing node. A value of the node performance limit matches the value of the node type of the relevant node in the direct performance limit field 462 of the node type management table 460. The operation performance field 473 indicates actual performance (measured performance) of each existing node in operation. The operation performance field 473 indicates, for example, an average value of the performance in the time slot indicated by the monitoring time slot field 442.

Figure 11:
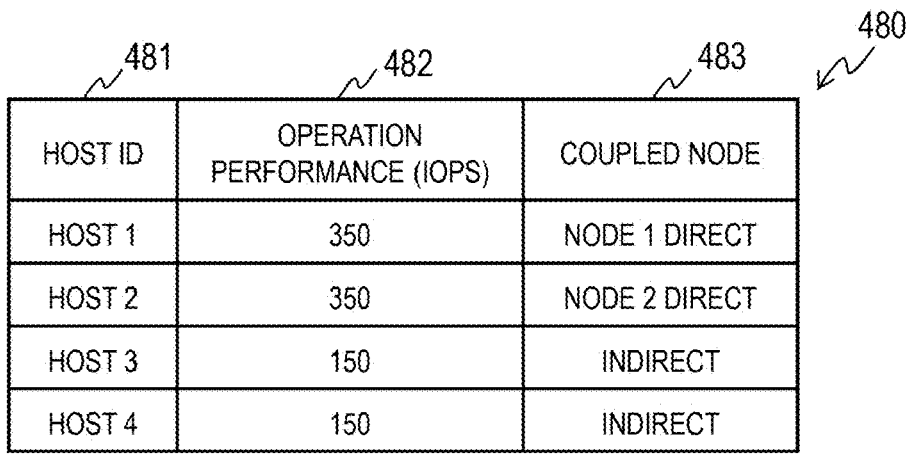
FIG. 11 is a table for showing a configuration example of a host performance management table included in the monitoring result information.

FIG. 11 is a table for showing a configuration example of a host performance management table 480 included in the monitoring result information 316. The host performance management table 480 is associated with a corresponding request ID. The host performance management table 480 manages access performance measured (monitored) during the operation of the existing hosts. The host performance management table 480 includes a host ID field 481, an operation performance field 482, and a coupled node field 483.

The host ID field 481 indicates the ID of the operating existing host. The operation performance field 482 indicates a measured value (monitoring result) of access performance of the existing host to the cluster (storage system). The operation performance field 482 indicates, for example, an average value of the performance in the time slot indicated by the monitoring time slot field 442. The coupled node field 483 stores the same information as that of the coupled node field 457.

The monitoring result information 316 includes information on monitoring results (not shown) in accordance with the configuration monitoring information management table 430, in addition to the above-mentioned information on the operation monitoring.

The proposed configuration information 317 is information on proposed configurations generated by the proposal processing program 301. Information (tables) generated by processing of the proposed configuration information 317 described below is included in the proposed configuration information 317.

A description is now given of processing by the proposal processing program 301. The proposal processing program 301 creates an extended configuration proposal of the storage system. The extended configuration proposal indicates the number of additional nodes, the performance of each additional node, and coupling forms between the storage system and the hosts, in addition to information on the existing nodes. In an example described below, three proposals are described as the extended configuration proposals.

Figure 12:
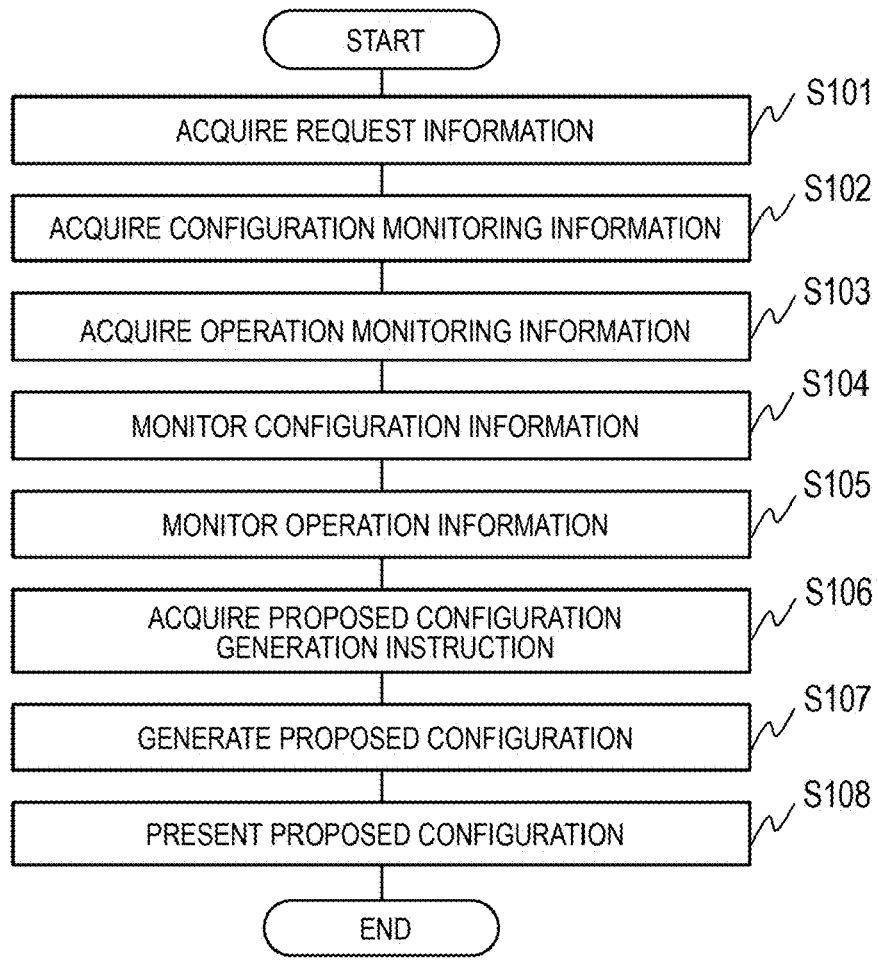
FIG. 12 is a flowchart for illustrating main processing of the proposal processing program.

FIG. 12 is a flowchart for illustrating main processing of the proposal processing program 301. The proposal processing program 301 acquires the request information 311 directed to the storage system input by the user (Step S101). The proposal processing program 301 acquires the configuration monitoring information 314 input by the user (Step S102). The proposal processing program 301 acquires the operation monitoring information 315 input by the user (Step S103).

The proposal processing program 301 monitors the configuration information on the storage system in accordance with the configuration monitoring information 314 (Step S104), and further monitors the configuration information on the storage system in accordance with the operation monitoring information 315 (Step S105). When the proposal processing program 301 acquires a proposed configuration generation instruction for an extended storage system from the user (Step S106), the proposal processing program 301 generates one or multiple proposed configurations (Step S107), and presents the generated proposed configurations to the user (Step S108). It should be noted that some of the above-mentioned steps may be omitted. For example, the inputs of the configuration monitoring information and the operation monitoring information may be omitted, and the configuration and the operation state may be monitored through use of methods set in advance.

Figure 13:
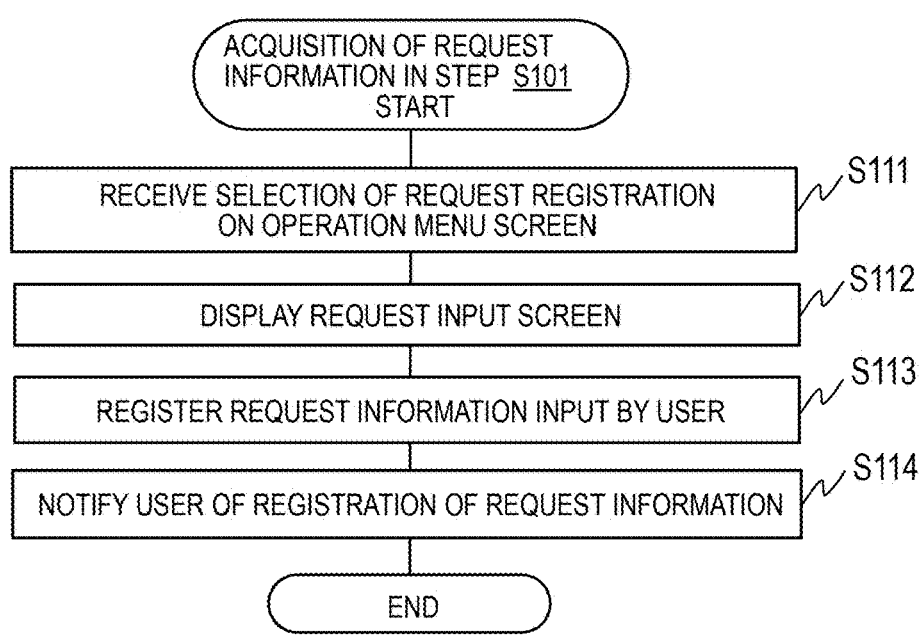
FIG. 13 is a flowchart for illustrating the acquisition of the request information in Step S101.

A detailed description is now given of the steps of the flowchart illustrated in FIG. 12. FIG. 13 is a flowchart for illustrating the acquisition of the request information in Step S101. The proposal processing program 301 receives a selection of a request registration by the user on an operation menu screen (not shown) displayed on the output device 135 (Step S111). The proposal processing program 301 displays a request input screen in response to a reception of the selection of the request registration (Step S112). The proposal processing program 301 acquires information input by the user on the request input screen, and registers the information in the request management table 410 (Step S113). The proposal processing program 301 displays the registration of the request information input by the user on, for example, the request input screen, to thereby notify the user of the registration (Step S114).

Figure 14:
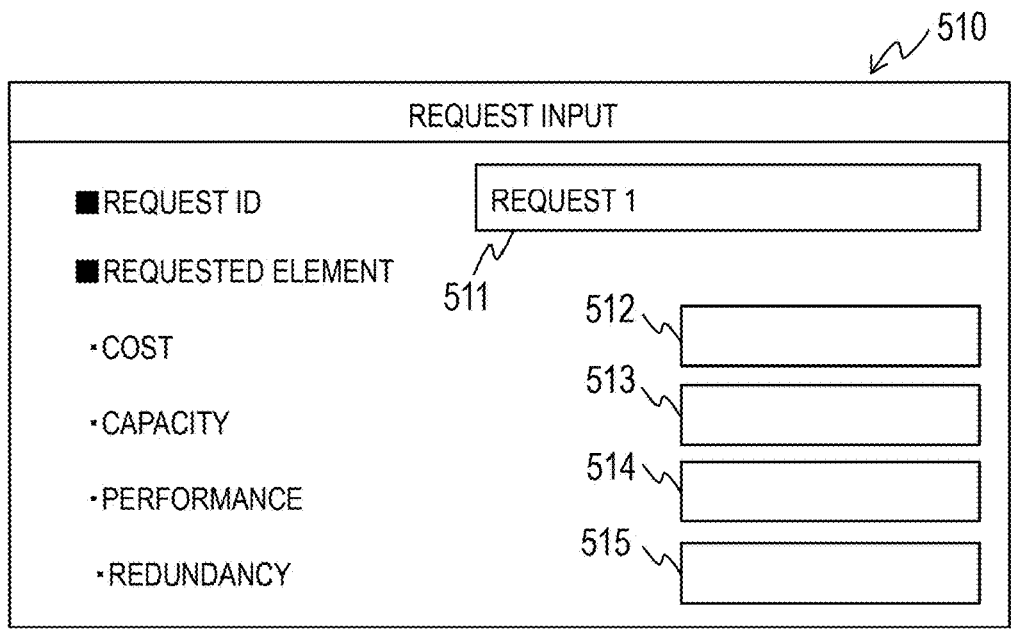
FIG. 14 is a diagram for illustrating an example of a request input screen.

FIG. 14 is a diagram for illustrating an example of a request input screen 510. The request input screen 510 includes a field 511 for inputting a request ID, a field 512 for inputting a requested cost of the storage system, a field 513 for inputting a requested capacity of the storage system, a field 514 for inputting the performance of the storage system, and a field 515 for inputting redundancy of the storage system. The proposal processing program 301 stores respective values input to the field 511 to the field 515 to corresponding cells of the request management table 410.

Figure 15:
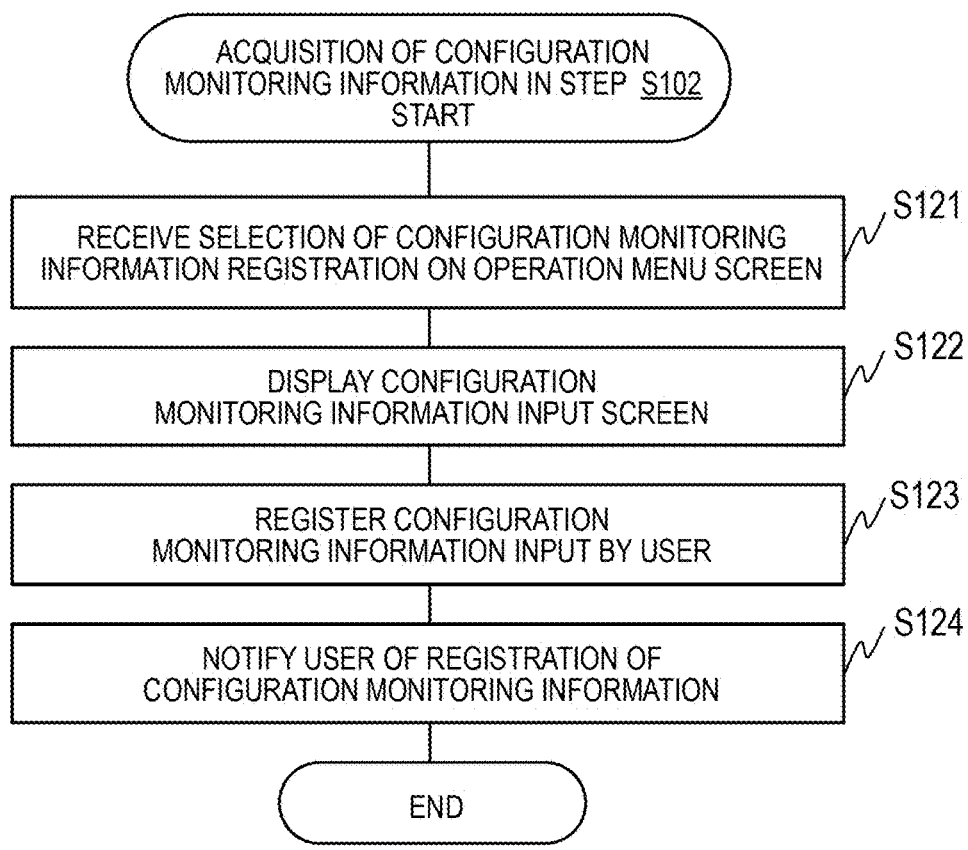
FIG. 15 is a flowchart for illustrating the acquisition of the configuration monitoring information in Step S102.

FIG. 15 is a flowchart for illustrating the acquisition of the configuration monitoring information in Step S102. The proposal processing program 301 receives a selection of a configuration monitoring information registration by the user on the operation menu screen (not shown) displayed on the output device 135 (Step S121). The proposal processing program 301 displays a configuration monitoring information input screen in response to a reception of the selection of the configuration monitoring information registration (Step S122). The proposal processing program 301 acquires information input by the user on the configuration monitoring information input screen, and registers the information in the configuration monitoring information management table 430 (Step S123). The proposal processing program 301 displays the registration of the configuration monitoring information input by the user on, for example, the configuration monitoring information input screen, to thereby notify the user of the registration (Step S124).

Figures 16, 17:
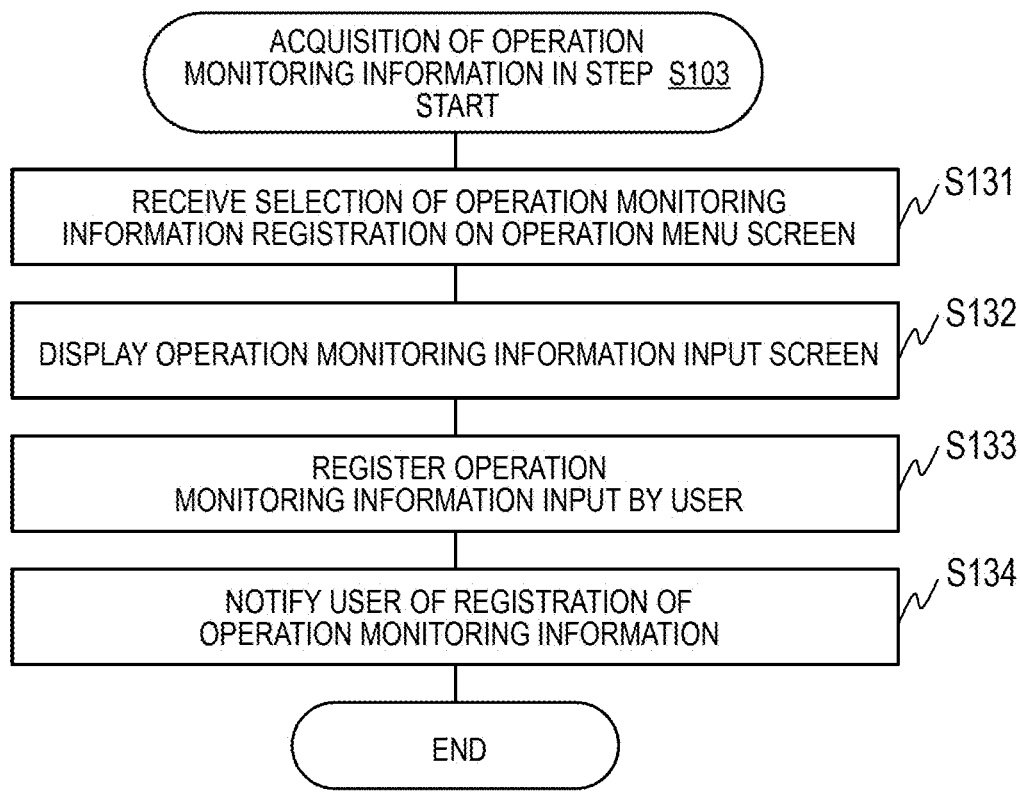
FIG. 16 is a diagram for illustrating an example of a configuration monitoring information input screen.
FIG. 17 is a flowchart for illustrating the acquisition of the operation monitoring information in Step S103.

FIG. 16 is a diagram for illustrating an example of a configuration monitoring information input screen 520. The configuration monitoring information input screen 520 includes a field 521 for inputting a monitoring ID, a field 522 for inputting an object to be monitored, a field 523 for inputting a monitoring cycle, and a field 524 for inputting a request ID associated with the configuration monitoring information. The proposal processing program 301 stores respective values input to the field 521 to the field 524 to corresponding cells of the configuration monitoring information management table 430.

FIG. 17 is a flowchart for illustrating the acquisition of the operation monitoring information in Step S103. The proposal processing program 301 receives a selection of an operation monitoring information registration by the user on the operation menu screen (not shown) displayed on the output device 135 (Step S131). The proposal processing program 301 displays an operation monitoring information input screen in response to a reception of the selection of the operation monitoring information registration (Step S132). The proposal processing program 301 acquires information input by the user on the operation monitoring information input screen, and registers the information in the operation monitoring information management table 440 (Step S133). The proposal processing program 301 displays the registration of the operation monitoring information input by the user on, for example, the operation monitoring information input screen, to thereby notify the user of the registration (Step S134).

Figure 18:
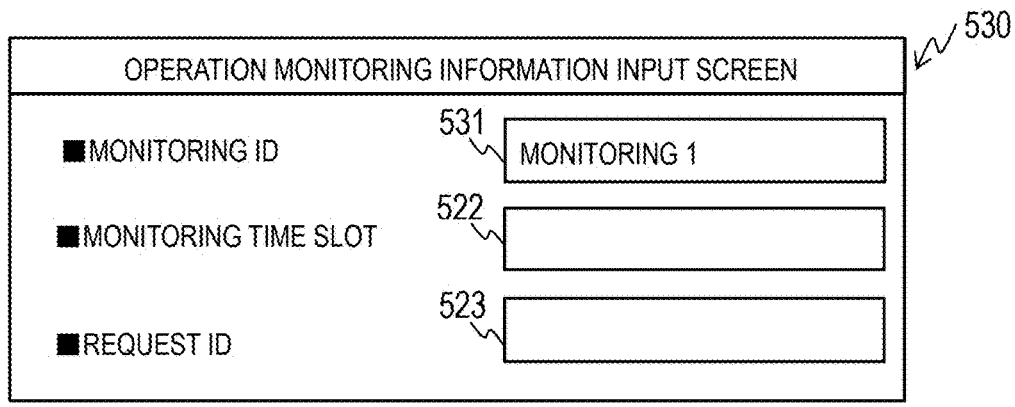
FIG. 18 is a diagram for illustrating an example of an operation monitoring information input screen.

FIG. 18 is a diagram for illustrating an example of an operation monitoring information input screen 530. The operation monitoring information input screen 530 includes a field 531 for inputting a monitoring ID, a field 532 for inputting a monitoring time slot, and a field 533 for inputting a request ID associated with the operation monitoring information. The proposal processing program 301 stores respective values input to the field 531 to the field 533 to corresponding cells of the operation monitoring information management table 440.

Figure 19:
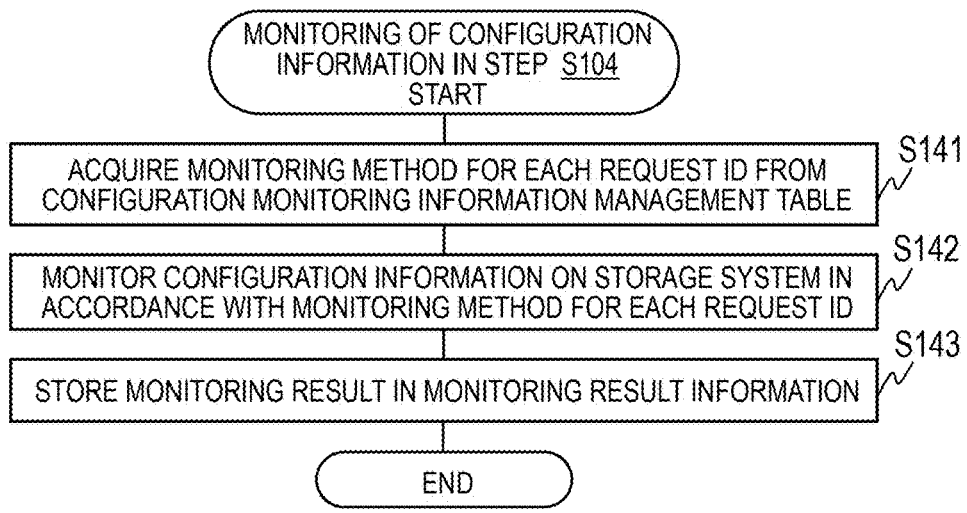
FIG. 19 is a flowchart for illustrating the monitoring of the configuration information in Step S104.

FIG. 19 is a flowchart for illustrating the monitoring of the configuration information in Step S104. The proposal processing program 301 acquires a monitoring method for each request ID from the configuration monitoring information management table 430 (Step S141). The proposal processing program 301 monitors the configuration information on the storage system in accordance with the monitoring method for each request ID (Step S142). Specifically, the proposal processing program 301 acquires information on the object to be monitored from the configuration management module 202 of the storage system. The proposal processing program 301 stores monitoring results associated with the corresponding request ID in the monitoring result information 316 (Step S143).

Figure 20:
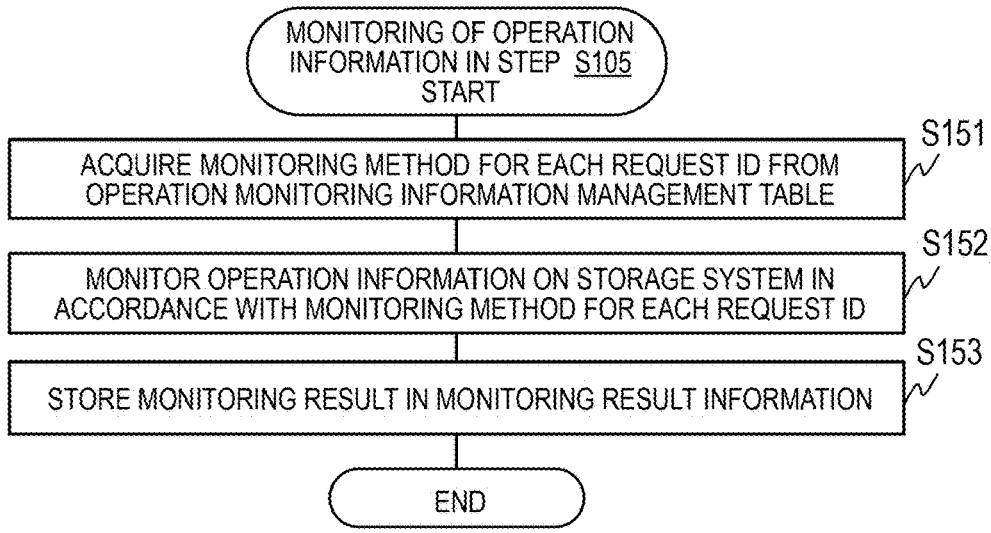
FIG. 20 is a flowchart for illustrating the monitoring of the operation information in Step S105.

FIG. 20 is a flowchart for illustrating the monitoring of the operation information in Step S105. The proposal processing program 301 acquires a monitoring method for each request ID from the operation monitoring information management table 440 (Step S151). The proposal processing program 301 monitors the operation information on the storage system in accordance with the monitoring method for each request ID (Step S152). Specifically, the proposal processing program 301 acquires information on the performance in the monitoring time slot indicated in the operation monitoring information management table 440 from the operation monitoring module 201 of each node. The performance information acquired from the node indicates access performance of each host that accesses the node.

The proposal processing program 301 stores monitoring results associated with the corresponding request ID in the monitoring result information 316 (Step S153). Specifically, the proposal processing program 301 stores the acquired performance information in the operation performance field 473 of the node performance management table 470 and the operation performance field 482 of the host performance management table 480, which are associated with the request ID.

Figure 21:
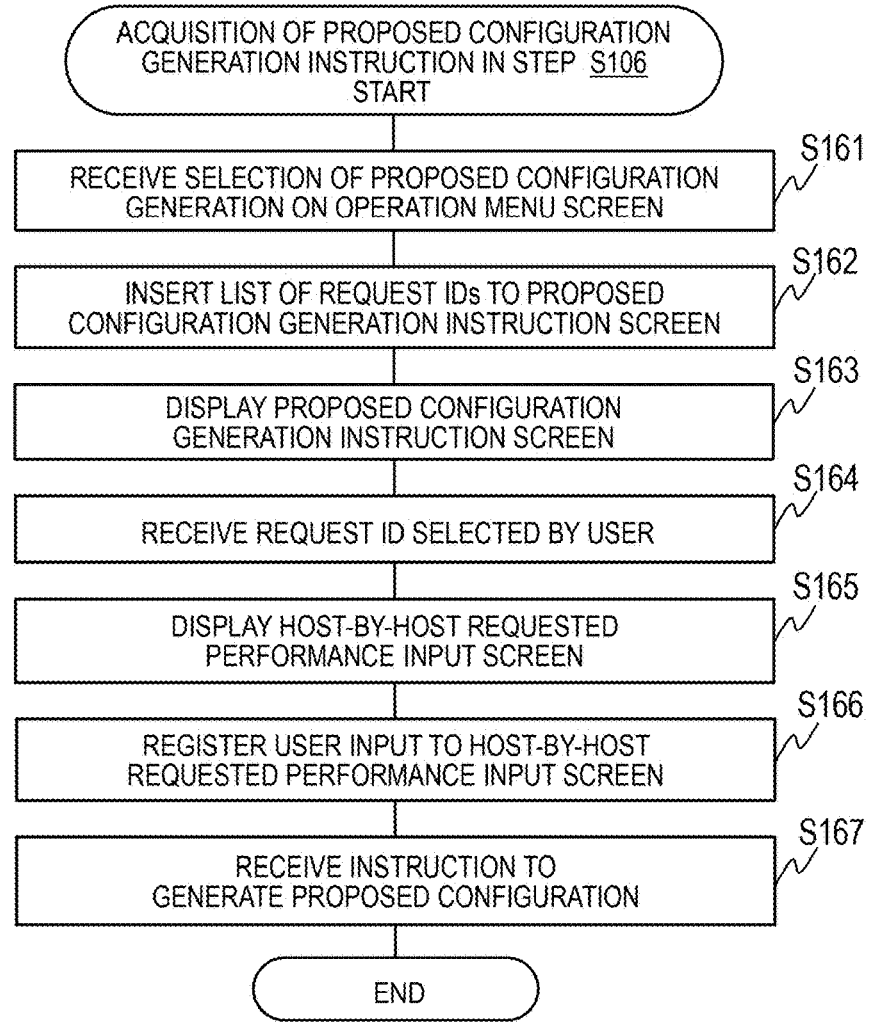
FIG. 21 is a flowchart for illustrating the acquisition of the proposed configuration generation instruction in Step S106.

FIG. 21 is a flowchart for illustrating the acquisition of the proposed configuration generation instruction in Step S106.

The proposal processing program 301 receives a selection of generation of the proposed configurations on the operation menu screen (not shown) (Step S161). The proposal processing program 301 inserts a list of the request IDs of the request management table 410 into a proposed configuration generation instruction screen (Step S162), and displays the proposed configuration generation instruction screen (Step S163).

Figure 22:
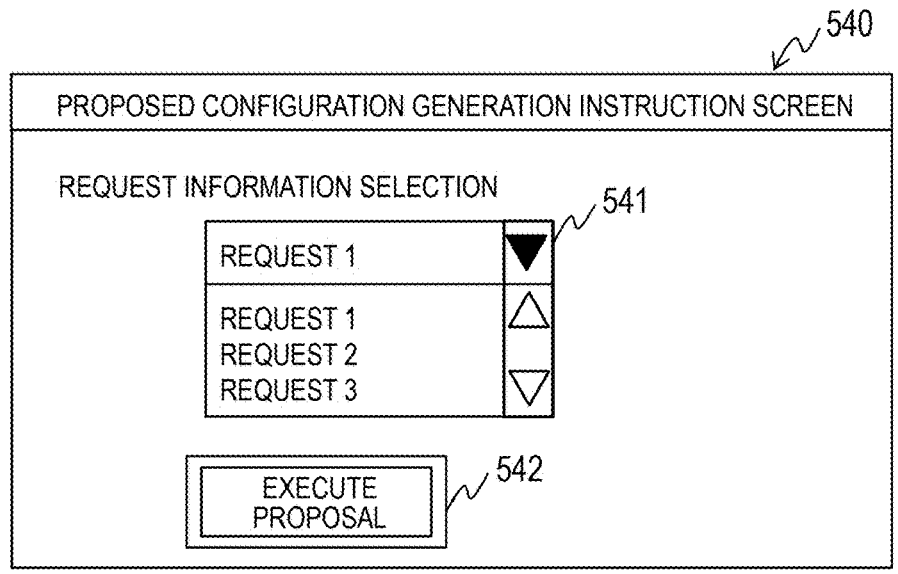
FIG. 22 is a diagram for illustrating an example of a proposed configuration generation instruction screen.

FIG. 22 is a diagram for illustrating an example of a proposed configuration generation instruction screen 540. The proposed configuration generation instruction screen 540 includes a pulldown menu 541 for selecting a request ID, and a proposal execution button 542. The user uses the input device 134 so as to select a request ID by which proposed configurations are to be requested on the pulldown menu 541. Returning to FIG. 21, the proposal processing program 301 receives the request ID selected by the user (Step S164).

Figure 23:
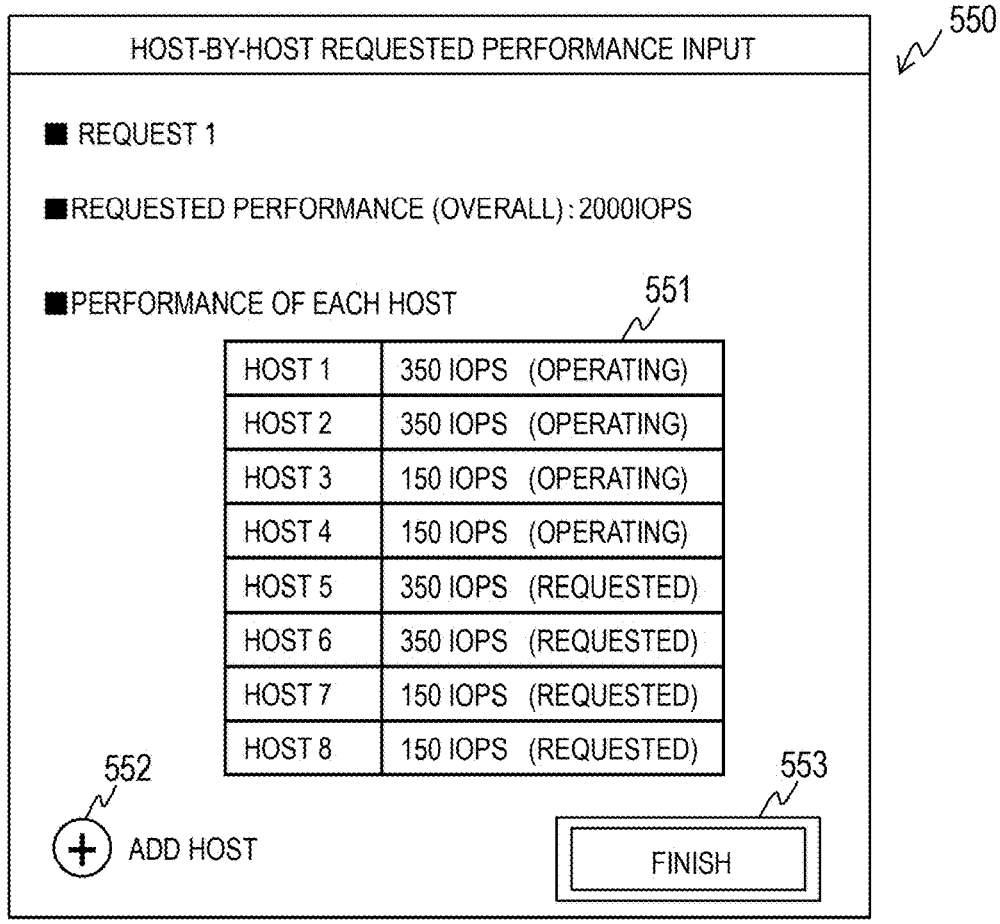
FIG. 23 is a diagram for illustrating an example of a host-by-host requested performance input screen.

When the proposal processing program 301 receives the user-specified request ID, the proposal processing program 301 displays a host-by-host requested performance input screen (Step S165). FIG. 23 is a diagram for illustrating an example of a host-by-host requested performance input screen 550. The host-by-host requested performance input screen 550 displays the selected request ID and requested performance associated with the request ID. In the example of FIG. 23, the request 1 is selected, and the requested performance by the request 1 from the entire storage system is 2,000 IOPS. The proposal processing program 301 acquires the values of the performance corresponding to the request ID from the requested element field 412 of the request management table 410.

The host-by-host requested performance input screen 550 includes a host-by-host performance table 551 for inputting performance of the additional hosts. The host-by-host performance table 551 displays the operation performance of the existing hosts, and simultaneously includes fields for inputting performance of the additional hosts requested by the user. The fields for inputting the requested performance of the additional hosts are added through a selection of a host addition button 552. The proposal processing program 301 acquires information on the operation performance of the existing hosts from the host performance management table 480.

In the example of FIG. 23, the host-by-host performance table 551 displays the operation performance of the existing hosts 1 to 4. The user requests the addition of the host 5 to the host 8, and further inputs the requested performance of each thereof. In this example, the user can specify the requested performance of the additional hosts within such a range that a sum of the host performance in the host-by-host performance table 551 is equal to or lower than the requested overall performance associated with the request ID. When the requested overall performance is not specified, it may be assumed that the total value of the host performance is not limited.

When a finish button 553 of the host-by-host requested performance input screen 550 is selected by the user, the proposal processing program 301 receives the user input to the host-by-host requested performance input screen, and registers the user input in the host requested performance table 420 associated with the selected request ID (Step S166). Further, when a proposal execution button 542 is selected by the user on the proposed configuration generation instruction screen 540, the proposal processing program 301 receives an instruction to generate the proposed configurations (Step S167).

The above-mentioned input method for the user request for the requested performance of the additional hosts is an example, and the information on the requested performance of the additional hosts may be input through use of any method. For example, the requested overall performance associated with the request ID may not be set. The requested overall performance is the sum of the operation performance of the existing hosts and the input requested performance of the additional hosts. Moreover, in this example, the operation performance of the existing hosts match the requested performance of the existing hosts. As a result, a proposal can be made in accordance with the current operation state of the storage system. The requested performance of the existing hosts may newly be specified by the user. In this case, the monitoring of the performance of the existing hosts may be omitted.

Figure 24:
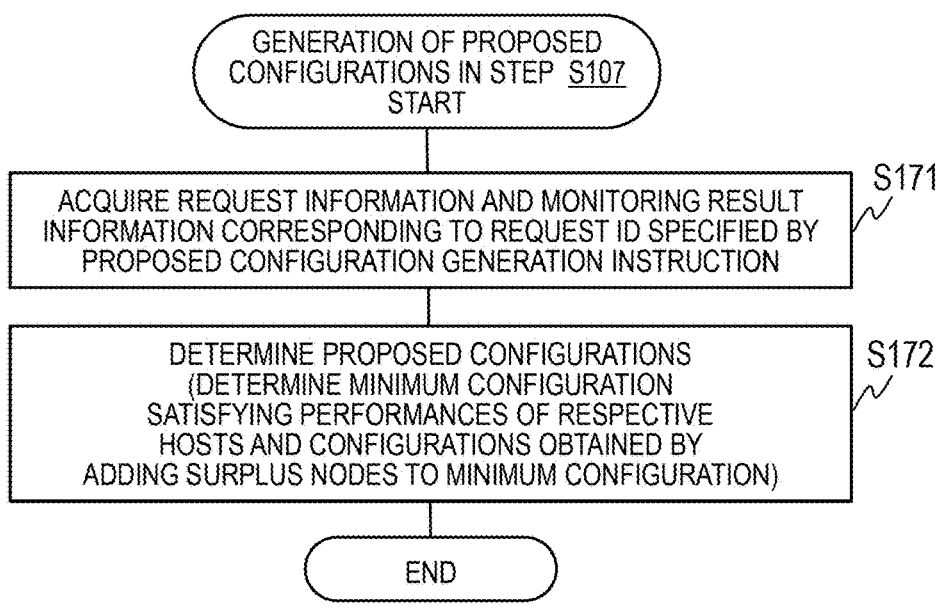
FIG. 24 is a flowchart for illustrating the generation of the proposed configurations in Step S107.

FIG. 24 is a flowchart for illustrating the generation of the proposed configurations in Step S107. When the proposal processing program 301 receives the instruction to generate the proposed configurations, the proposal processing program 301 generates proposed configurations for extending the storage system based on the performance of the existing hosts and the existing nodes and the requested performance of the additional hosts specified by the user.

The proposal processing program 301 acquires the request information 311 and the monitoring result information 316 corresponding to the selected request ID (Step S171). The proposal processing program 301 generates proposed configurations based on the acquired information (Step S172). As a result, appropriate configurations can be proposed in accordance with the performance request from the user.

In an example described below, the proposal processing program 301 generates multiple proposed configurations. As a result, options for the user can be increased. Moreover, the multiple proposed configurations include a configuration (minimum configuration) formed of the minimum number of nodes that can satisfy the user request. As a result, it is possible to avoid an unnecessary addition of nodes for the user. The multiple proposed configurations further include a configuration in which surplus nodes are added to the minimum configuration. The number of the generated proposed configurations may be one, and may not include the configuration including the minimum number of nodes.

Figure 25:
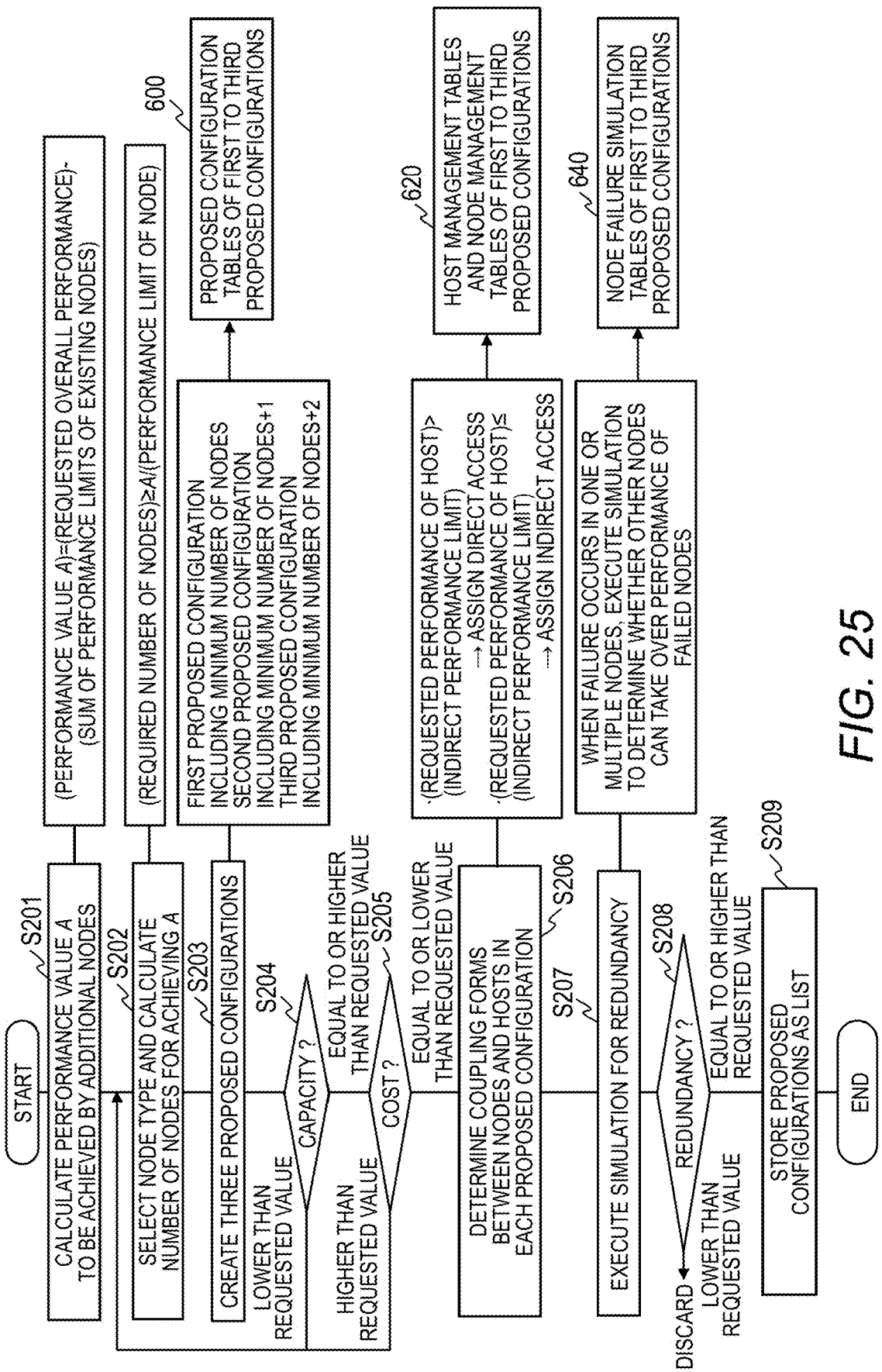
FIG. 25 is a flowchart for illustrating details of the generation of proposed configurations in Step S172.

FIG. 25 is a flowchart for illustrating details of the generation of proposed configurations in Step S172. In an example described below, the proposal processing program 301 generates the proposed configuration including the minimum number of nodes that satisfies the user request, a proposed configuration in which one surplus node is added to the proposed configuration having the minimum number of nodes, and a proposed configuration in which two surplus nodes are added to the proposed configuration having the minimum number of nodes.

First, the proposal processing program 301 calculates a performance value A to be achieved by the additional nodes (Step S201). Specifically, the proposal processing program 301 determines a value obtained by subtracting a value, which is a sum of the performance limits of the respective existing nodes, from the overall performance requested by the user as the performance value A. The proposal processing program 301 acquires the value of the requested overall performance from the request management table 410, and acquires the values of the respective performance limits of the existing nodes from the node performance management table 470. When the requested overall performance is not specified independently of the host requested performance, a sum of the requested performance of the existing hosts and the additional hosts is the requested overall performance.

Then, the proposal processing program 301 selects the node type of the additional nodes, and calculates the number of nodes for achieving the performance value A (Step S202). In this example, the proposal processing program 301 refers to the node type management table 460 to select one node type, and acquires the value of the performance limit of the node type. The proposal processing program 301 determines an integer equal to or larger than a value obtained by dividing the performance value A by the performance limit value of the selected node type as the minimum required number of the additional nodes. Multiple node types may be selected. For example, the numbers of nodes of the respective node types may be determined so as to match one another as much as possible.

Then, the proposal processing program 301 generates the three proposed configurations (proposed configuration group) (Step S203). As described above, the proposal processing program 301 generates the proposed configuration (first proposed configuration) including the minimum number of nodes that satisfies the user request, the proposed configuration (second proposed configuration) in which one surplus node is added to the proposed configuration having the minimum number of nodes, and the proposed configuration (third proposed configuration) in which two surplus nodes are added to the proposed configuration having the minimum number of nodes.

The first proposed configuration is a configuration in which the minimum required number of nodes calculated in Step S202 is added to the existing nodes. The proposal processing program 301 creates a proposed configuration table 600 indicating information on the respective three proposed configurations. A detailed description is given later of the proposed configuration table.

Then, the proposal processing program 301 compares the proposed configuration having the minimum capacity out of the three proposed configurations and the requested capacity associated with the request ID with each other (Step S204). The proposal processing program 301 refers to the node performance management table 470, the node configuration management table 450, and the node type management table 460, to thereby be able to calculate the capacity of the proposed configuration. When the capacity of the proposed configuration is smaller than the requested capacity, the proposal processing program 301 returns to Step S202.

When the proposal processing program 301 returns to Step S202, the proposal processing program 301 adds the same number of nodes of the same type as the one before the processing in Step S202 to the three proposed configurations so that the first proposed configuration having the minimum number of nodes satisfies the requested capacity. In another example, the proposal processing program 301 may select a node type that is not selected, and may regenerate the three proposed configurations based on the selected node type.

Then, the proposal processing program 301 compares the proposed configuration (third proposed configuration) having the maximum cost out of the three proposed configurations and the requested cost associated with the request ID with one another (Step S205). The proposal processing program 301 refers to the node type management table 460 and the node performance management table 470, to thereby be able to calculate the cost of the proposed configuration. When the cost of the proposed configuration is higher than the requested cost, the proposal processing program 301 returns to Step S202. In Step S202, the proposal processing program 301 selects a different node type.

When the proposed configuration groups of all of the node types cannot satisfy the request cost, the proposal processing program 301 may select, for example, the proposed configuration group whose first proposed configuration has the lowest cost, and may then proceed to the next step. The proposed configuration to be compared with the requested cost may be a proposed configuration different from the proposed configuration having the highest cost. In this case, a proposed configuration having a cost higher than the requested cost may be discarded, or may be maintained.

Then, the proposal processing program 301 determines each coupling form between the node and host in each of the proposed configurations (Step S206). The proposal processing program 301 generates a host management table and a node management table 620, which indicates the coupling forms in each of the three proposed configurations. A pair of the host management table and the node management table indicates the coupling forms between the hosts and the nodes in one proposed configuration. A detailed description is given later of the host management table and the node management table.

The proposal processing program 301 determines an access method and an access destination (coupling form) of each host so that the requested performance of each host is satisfied. The access method is any one of the direct access and the indirection access. With the method disclosed herein, the direct access or the indirect access is assigned to the host so that an appropriate proposed configuration can be executed in the storage system.

When the requested performance of the host is higher than the sum of the indirect performance limits of all of the nodes, the proposal processing program 301 assigns the direct access to the host. The access destination of the direct access is selected from nodes having performance limits equal to or higher than the requested performance of the host.

When the requested performance of the host is equal to or lower than the sum of the indirect performance limits of all of the nodes, the proposal processing program 301 basically assigns the indirect access to the host. When any one of the node performance limits is lower than a sum of the requested performance of hosts accessing the node, the direct access is assigned to any one of nodes to which the indirect access is assigned. As described above, the host to which the indirect access is assigned can access all of the nodes.

When both of the direct access and the indirect access can be assigned to the host, the proposal processing program 301 assigns the indirect access. The preferential assignment of the indirect access can suppress localization of data. A method of creating an extended configuration proposal of a storage system herein can be applied to a storage system in which an access method different from the direct access and the indirect access is assigned to a host.

Then, the proposal processing program 301 executes simulation for the redundancy of each of the proposed configurations (Step S207). Specifically, the proposal processing program 301 executes simulation so as to determine whether or not performance values provided by one or multiple nodes can be taken over by other nodes when a failure occurs in the one or multiple nodes. The proposal processing program 301 generates a node failure simulation table 640, which indicates simulation results of each of the proposed configurations. A detailed description is given later of the node failure simulation table.

Then, the proposal processing program 301 determines whether or not the redundancy of each of the proposed configurations satisfies the requested redundancy associated with the request ID (Step S208). When the redundancy of the proposed configuration is lower than the requested redundancy, the proposal processing program 301 discards the proposed configuration. The proposal processing program 301 selects proposed configurations whose redundancy is equal to or higher than the requested redundancy, and registers the proposed configurations in a proposed configuration list (Step S209).

The flowchart illustrated in FIG. 25 describes creation of the multiple proposed configurations of the selected one node type. The proposal processing program 301 may create proposed configurations of multiple node types in accordance with the procedure illustrated in FIG. 25. As a result, the options for the user can be increased so as to determine an extended configuration of the storage system that is more appropriate for the user.

A description is now given of an example of a method of creating, by the proposal processing program 301, proposed configurations of a computer system including the storage system (cluster) and the hosts. The proposal processing program 301 determines the additional node configuration for the storage system and the coupling forms between the hosts and the storage system so as to satisfy the requested performance of each of the hosts as described above. The additional node configuration indicates the number of the additional nodes, and types of the respective additional nodes. The coupling form indicates an access method and an access destination node of each host. The proposal processing program 301 presents, for example, a new configuration of the storage system including the additional nodes and the coupling forms between the hosts and the storage system to the user.

In an example described below, it is assumed that the storage system (cluster) is formed of the three existing nodes (the node 1, the node 2, and the node 3), and the four existing hosts (the host 1 to the host 4) access the storage system. Moreover, it is assumed that the user requests newly adding the four hosts (the host 5 to the host 8).

Information on the request from the user, the existing nodes, the existing hosts, and the additional hosts is as described with reference to FIG. 4 to FIG. 11. The proposal processing program 301 proposes the new extended configurations of the storage system for the user request indicated by the request 1 in the request management table 410 of FIG. 3 and the host requested performance table 420 shown in FIG. 4. Moreover, in the example described below, for the sake of a simple description, it is assumed that a host to which the direct access is assigned accesses only one node.

The proposal processing program 301 determines the storage system configuration and the coupling forms so that the requested performance of each of the existing hosts and the additional hosts is are satisfied. In the example described below, the requested performance of the existing hosts is the operation performance thereof. Moreover, for the sake of a simple description, the sum of the requested performance of the hosts matches the requested overall performance of the storage system.

Specifically, the proposal processing program 301 determines the number of nodes to be added to the storage system and characteristics of each node, and the access method (the direct access or the indirect access) to the storage system and an access destination of each of the existing hosts and the additional hosts. As described above, the access destination of the indirect access is all of the nodes.

In the example described below, the proposal processing program 301 creates the three proposed configurations (extended configuration proposals). Moreover, the proposal processing program 301 includes the configuration having the minimum number of the nodes to be added so as to satisfy the user request into the proposed configurations. The number of proposals by the proposal processing program 301 is one or four or more, and the configuration having the minimum number of the nodes to be added may not be proposed. The proposal processing program 301 further generates the proposed configurations in which one node and two nodes are added to the minimum number of the nodes.

Figure 26:
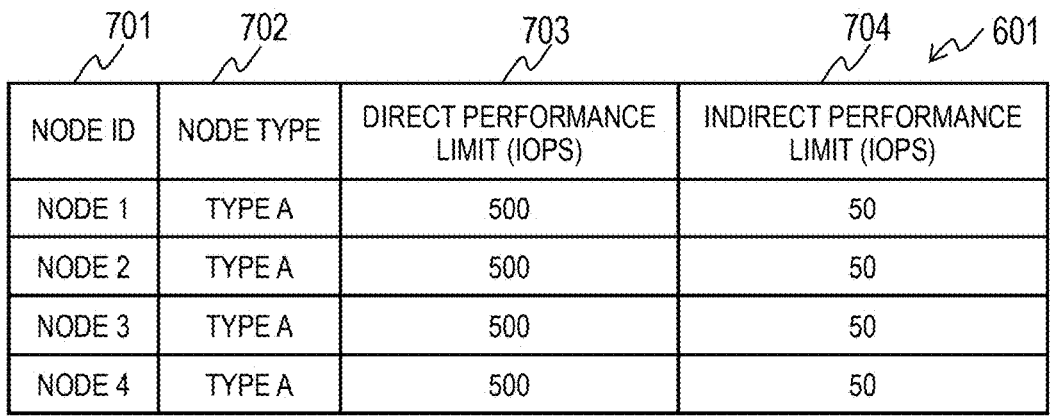
FIG. 26 is a proposed configuration table of the first proposed configuration.
Figure 27:
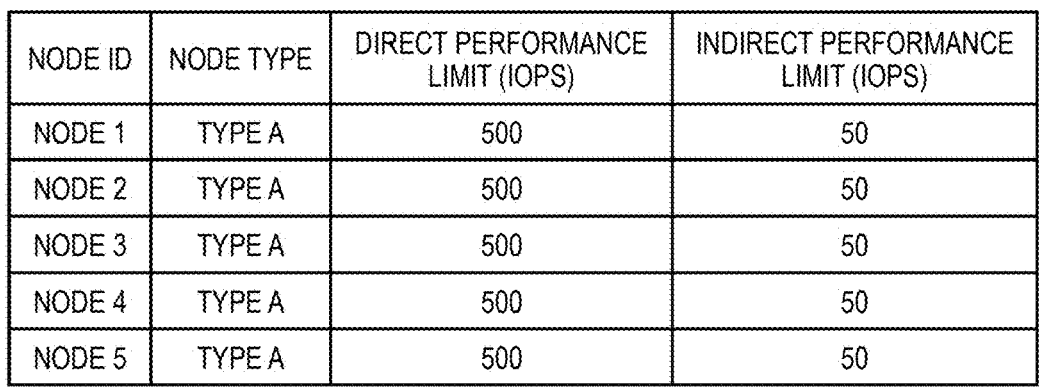
FIG. 27 is a proposed configuration table of the second proposed configuration.
Figure 28:
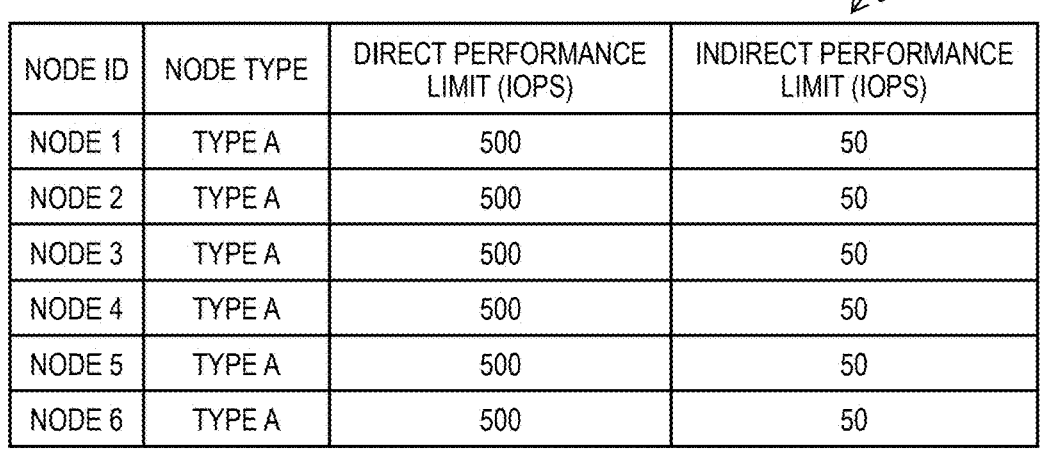
FIG. 28 is a proposed configuration table of the third proposed configuration.

First, a description is given of an example of the creation of the proposed configuration tables in Step S203. FIG. 26, FIG. 27, and FIG. 28 are proposed configuration tables 601, 602, and 603 of the first proposed configuration, the second proposed configuration, and the third proposed configuration, respectively, which are obtained when the proposal processing program 301 selects a node type A as the node type of the nodes to be added. As shown in FIG. 26, the proposed configuration table 601 includes a node ID field 701, a node type field 702, a direct performance limit field 703, and an indirect performance limit field 704.

The node ID field 701 indicates an ID of each node of the first proposed configuration. The node type field 702, the direct performance limit field 703, and the indirect performance limit field 704 indicate the characteristics of each node. Those pieces of information can be acquired from the node configuration management table 450 and the node type management table 460. The first proposed configuration adds one node (node 4) of the node type A to the three existing nodes. The performance limit of the node matches the direct performance limit. A sum of the performance limits of the node 1 to the node 4 is 2,000, and thus matches the requested performance of 2,000 of the request ID 1.

The proposed configuration tables 602 and 603 of the second proposed configuration and the third proposed configuration also have the same table configurations as that of the proposed configuration table 601, and a description of the fields is therefore omitted. The second proposed configuration adds the two nodes (the node 4 and the node 5) of the node type A. The third proposed configuration adds the three nodes (the node 4, the node 5, and the node 6) of the node type A.

A description is now given of an example of the determination of the coupling forms between the hosts and the storage system in each of the proposed configurations in Step S206. FIG. 29 and FIG. 30 are a host management table 621 and a node management table 622 of the first proposed configuration, respectively. The host management table 621 shows the requested performance and the coupled nodes (access destinations) of the existing hosts and the additional hosts. Specifically, the host management table 621 includes a host ID field 721, an operation performance field 722, a requested performance field 723, and a coupled node field 724.

The host ID field 721 indicates an ID of each of the hosts that access the storage system. In the example of FIG. 29, the four existing hosts (the host 1 to the host 4) and the four additional hosts (the host 5 to the host 8) are shown. The operation performance field 722 indicates the operation performance of the existing host. The requested performance field 723 indicates the requested performance of the existing host or the additional host. The requested performance of the existing host matches the operation performance. The information contained in the host ID field 721, the operation performance field 722, and the requested performance field 723 can be acquired from the host requested performance table 420.

The coupled node field 724 indicates the access method and the access destination of each host. The proposal processing program 301 determines the access method and the access destination of each host so that the requested performance of each host is satisfied. Specifically, when the sum of the indirect performance limits of all of the nodes is lower than the requested performance of the host, the proposal processing program 301 assigns the direct access to the host. When the sum of the indirect performance limits of all of the nodes is equal to or lower than the requested performance of the host, the proposal processing program 301 assigns the indirect access to the host.

The proposal processing program 301 determines the access destination of the host so that a sum of the requested performance of the hosts that access a node does not exceed the performance limit of the node. The proposal processing program 301 changes the access method of a host to which the indirect access is assigned to the direct access depending on necessity so as to satisfy this condition. Further, the proposal processing program 301 determines the access destination of a host to which the direct access is assigned.

The node management table 622 shown in FIG. 30 includes a node ID field 731, a node type field 732, a performance limit field 733, a requested performance total value field 734, a direct coupling field 735, and an indirect coupling field 736. The node ID field 731 indicates an ID of each of the nodes that form the storage system. The node type field 732 and the performance limit field 733 indicate the node type and the performance limit of each node, respectively.

The requested performance total value field 734 indicates a requested performance total value of each node. The requested performance total value is the total value of the requested performance of the hosts that access the node as described above. It is assumed that the requested performance of the direct access is assigned to the access destination node thereof, and the requested performance of the indirect access is equally assigned to all of the nodes.

The direct coupling field 735 indicates the host ID and the requested performance of a host that accesses the node through use of the direct access. In this example, the direct access is assigned to the host 1, the host 2, the host 5, and the host 6, and the requested performance each thereof is 350 IOPS. Moreover, the access destinations of the host 1, the host 2, the host 5, and the host 6 are the node 1, the node 2, the node 3, and the node 4, respectively. The total value of the indirect performance limits of the four nodes is 200. Therefore, the direct access is assigned to those four hosts.

The indirect coupling field 736 indicates the host ID and the requested performance of each host that accesses the node through use of the indirect access. In the example of FIG. 30, the indirect access is assigned to the host 3, the host 4, the host 7, and the host 8. The requested performance of each of the hosts is 150, and a total value of the indirect performance limits of the four nodes is lower than 200. Therefore, the indirect access is assigned to those four hosts. The requested performance from the nodes is equally divided into four portions, which are assigned to the node 1 to the node 4.

As the requested performance total value field 734 indicates, both of the performance limit and the requested performance total value (200+37.5*4) of each node are 500. The performance limit of each node is equal to or higher than the requested performance total value, and it is thus estimated that the requested performance of each host can appropriately be satisfied.

FIG. 31 and FIG. 32 are a host management table 623 and a node management table 624 of the second proposed configuration, respectively. The table configurations of the host management table 623 and the node management table 624 are the same as those of the host management table 621 and the node management table 622 of the first proposed configuration. The second proposed configuration adds the two nodes (the node 4 and the node 5) of the node type A.

Content of the host management table 623 shown in FIG. 31 is the same as that of the host management table 621 of the first proposed configuration shown in FIG. 29. Specifically, the coupling forms between the hosts and the storage system are the same. The node management table 624 of the second proposed configuration shown in FIG. 32 further includes a record of the added node 5 compared with the node management table 622 of the first proposed configuration shown in FIG. 30.

There is no host that makes the direct access to the node 5, and only the hosts to which the indirect access is assigned access the node 5. The number of nodes of the access destinations of the hosts to which the indirect access is assigned is increased compared with the first proposed configuration, and the requested performance of the indirect access host to each node is thus reduced. As a result of the addition of the node 5, a margin of the performance limit of each node with respect to the requested performance is increased.

FIG. 33 and FIG. 34 are a host management table 625 and a node management table 626 of the third proposed configuration, respectively. The table configurations of the host management table 625 and the node management table 626 are the same as those of the host management table 621 and the node management table 622 of the first proposed configuration. The third proposed configuration adds the three nodes (the node 4, the node 5, and the node 6) of the node type A.

Content of the host management table 625 of the third proposed configuration shown in FIG. 33 is the same as that of the host management table 621 of the first proposed configuration shown in FIG. 29. Specifically, the coupling forms between the hosts and the storage system are the same. The node management table 626 of the third proposed configuration shown in FIG. 34 further includes a record of the added nodes 5 and 6 compared with the node management table 622 of the first proposed configuration shown in FIG. 30.

There is no host that makes the direct access to the node 5 and the node 6, and only the hosts to which the indirect access is assigned access the node 5 and the node 6. The number of nodes of the access destinations of the hosts to which the indirect access is assigned is increased compared with the first proposed configuration and the second proposed configuration, and the requested performance of the indirect access host to each node is thus reduced. As a result of the addition of the node 5 and the node 6, a margin of the performance limit of each node with respect to the requested performance is larger than those of the first proposed configuration and the second proposed configuration.

A description is now given of an example of the redundancy simulation in Step S207. FIG. 35 and FIG. 36 show node failure simulation tables for the first proposed configuration. Specifically, FIG. 35 is a node-failure host management table 641. The node-failure host management table 641 includes content in which simulation results are reflected in the host management table 621 of the first proposed configuration shown in FIG. 29. FIG. 36 is a node-failure node management table 642. The node-failure node management table 642 includes content simulation results are reflected in the node management table 622 of the first proposed configuration shown in FIG. 30.

FIG. 35 and FIG. 36 are the tables for showing simulation results obtained when a failure occurs in the node 1. When a failure occurs in the node 1, a performance value of 500 IOPS exerted by the node 1 cannot be covered by other nodes. Thus, the redundancy of the first proposed configuration is 0, and does not satisfy the redundancy requested by the request 1. Therefore, the first proposed configuration is discarded (Step S208).

FIG. 37 and FIG. 38 show node failure simulation tables for the second proposed configuration. Specifically, FIG. 37 is a node-failure host management table 643. The node-failure host management table 643 includes content in which simulation results are reflected in the host management table 623 of the second proposed configuration shown in FIG. 31. FIG. 38 is a node-failure node management table 644. The node-failure node management table 644 includes content in which simulation results are reflected in the node management table 624 of the second proposed configuration shown in FIG. 32.

FIG. 37 and FIG. 38 are the tables for showing the simulation results obtained when the failure occurs in the node 1. When a failure occurs in the node 1, a performance value of 470 IOPS exerted by the node 1 can be covered by other nodes. In the examples of FIG. 37 and FIG. 38, the node 5 is assigned to the host 1 that makes the direct access to the node 1. Moreover, the indirect access performance (120 IOPS) assigned to the node 1 is equally (30 IOPS) assigned to the remaining nodes. Moreover, the requested performance of the host, to which the indirect access is assigned, directed to each node increases from 30 to 37.5.

The proposal processing program 301 similarly executes failure simulation from the other nodes 2 to 5. In this example, even when a failure occurs in any node, other nodes can cover the performance value exerted by the failed node. Further, the proposal processing program 301 increases the number of failed nodes from one to two, and then executes simulation for all combinations of two nodes.

The proposal processing program 301 executes the simulation while increasing the number of failed nodes, to thereby determine the redundancy of the storage system. In the second proposed configuration of this example, when failures occur in two nodes, the performance thereof cannot be covered by the other nodes. Thus, the redundancy is one. When the simulation results satisfy the requested redundancy, the proposal processing program 301 may omit subsequent simulation.

FIG. 39 and FIG. 40 show node failure simulation tables for the third proposed configuration. Specifically, FIG. 39 is a node-failure host management table 645. The node-failure host management table 645 includes content in which simulation results are reflected in the host management table 625 of the third proposed configuration shown in FIG. 33. FIG. 40 is a node-failure node management table 646. The node-failure node management table 646 includes content in which simulation results are reflected in the node management table 626 of the third proposed configuration shown in FIG. 34.

FIG. 39 and FIG. 40 are the tables for showing the simulation results obtained when the failure occurs in the node 1. When a failure occurs in the node 1, a performance value of 450 IOPS exerted by the node 1 can be covered by other nodes. In the examples of FIG. 39 and FIG. 40, the node 5 is assigned to the host 1 that makes the direct access to the node 1. Moreover, the indirect access performance (100 IOPS) assigned to the node 1 is equally (20 IOPS) assigned to the remaining nodes. Moreover, the requested performance of the host, to which the indirect access is assigned, directed to each node increases from 25 to 30.

The proposal processing program 301 similarly executes failure simulation from the other nodes 2 to 6. In this example, even when a failure occurs in any node, other nodes can cover the performance value exerted by the failed node.

Further, the proposal processing program 301 increases the number of failed nodes from one to two, and then executes simulation for all combinations of two nodes. The proposal processing program 301 executes the simulation while increasing the number of failed nodes, to thereby determine the redundancy of the storage system. The redundancy of the third proposed configuration of this example is two. When the simulation results satisfy the requested redundancy, the proposal processing program 301 may omit subsequent simulation.

FIG. 41 is a table for showing a configuration example of a proposed configuration list 800 that stores information on the proposed configurations that satisfy the user request. The proposal processing program 301 includes the proposed configurations whose simulation results satisfy the use request in the proposed configuration list 800, and stores the proposed configuration list 800 in the storage device. The proposal processing program 301 further displays the proposed configuration list 800 on the output device 135.

When the second proposed configuration is selected by the user in the proposed configuration list 800, the proposal processing program 301 displays a detailed image 810 of the second proposed configuration as shown in FIG. 42. Content of the details 810 of the second proposed configuration is the same as that of the node management table 624 of the second proposed configuration.

When the third proposed configuration is selected by the user in the proposed configuration list 800, the proposal processing program 301 displays a detailed image 815 of the third proposed configuration as shown in FIG. 43. Content of the details 815 of the third proposed configuration is the same as that of the node management table 626 of the third proposed configuration. With this display, the user can know the node configuration of the storage system that satisfies the request, and the coupling forms between the hosts and the storage system.

A description is now given of examples of the creation of the proposed configuration tables in Step S203, the determination of the coupling forms between the hosts and the storage system in each of the proposed configurations in Step S206, and the redundancy simulation in Step S207 when the proposal processing program 301 selects the node type B as the node type of the additional nodes.

First, a description is given of an example of the creation of the proposed configuration tables in Step S203. FIG. 44, FIG. 45, and FIG. 46 are proposed configuration tables 611, 612, and 613 of the first proposed configuration, the second proposed configuration, and the third proposed configuration, respectively, which are obtained when the proposal processing program 301 selects the node type B as the node type of the nodes to be added. The table configuration is the same as that obtained when the node type A is selected, and a detailed description thereof is therefore omitted.

The first proposed configuration adds one node (node 4) of the node type B to the three existing nodes. The direct performance limit of the node type B is 1,000 IOPS, and the indirect performance limit is 100 IOPS. Those values are larger than 500 IOPS and 50 IOPS of the node type A, respectively.

A sum of the performance limits of the node 1 to the node 4 is 2,500, and is thus larger than the requested performance of 2,000 of the request ID 1. The second proposed configuration adds the two nodes (the node 4 and the node 5) of the node type B. The third proposed configuration adds the three nodes (the node 4, the node 5, and the node 6) of the node type B.

A description is now given of an example of the determination of the coupling forms between the hosts and the storage system in each of the proposed configurations in Step S206. FIG. 47 and FIG. 48 are a host management table 631 and a node management table 632 of the first proposed configuration, respectively. Content of the host management table 631 is the same as that of the host management table 621 of the first proposed configuration shown in FIG. 29. Content of the node management table 632 is different from that of the node management table 622 of the first proposed configuration of the type A shown in FIG. 30 in the node type and the performance limit of the node 4, and is the same in other points.

The determination of the access method and the access destination of the host is as described in the example in which the node type A is selected. Moreover, the method of assigning the requested performance of the direct access and the indirect access to the nodes is as described in the example in which the node type A is selected. As shown in the node management table 632, the performance limit of each node is equal to or higher than the requested performance of each node, and it is thus estimated that the requested performance of each host can appropriately be satisfied.

FIG. 49 and FIG. 50 are a host management table 633 and a node management table 634 of the second proposed configuration, respectively. The table configurations of the host management table 633 and the node management table 634 are the same as those of the host management table 631 and the node management table 632 of the first proposed configuration. The second proposed configuration adds the two nodes (the node 4 and the node 5) of the node type B.

Content of the host management table 633 shown in FIG. 49 is the same as that of the host management table 631 of the first proposed configuration shown in FIG. 47. Specifically, the coupling forms between the hosts and the storage system are the same. The node management table 634 of the second proposed configuration shown in FIG. 50 further includes a record of the added node 5 compared with the node management table 632 of the first proposed configuration shown in FIG. 48.

There is no host that makes the direct access to the node 5, and only the hosts to which the indirect access is assigned access the node 5. The number of nodes of the access destinations of the hosts to which the indirect access is assigned is increased compared with the first proposed configuration, and the requested performance of the indirect access host to each node is thus reduced. As a result of the addition of the node 5, a margin of the performance limit of each node with respect to the requested performance is increased.

FIG. 51 and FIG. 52 are a host management table 635 and a node management table 636 of the third proposed configuration, respectively. The table configurations of the host management table 635 and the node management table 636 are the same as those of the host management table 631 and the node management table 632 of the first proposed configuration. The third proposed configuration adds the three nodes (the node 4 the node 5, and the node 6) of the node type B.

Content of the host management table 635 of the third proposed configuration shown in FIG. 51 is the same as that of the host management table 631 of the first proposed configuration shown in FIG. 47. Specifically, the coupling forms between the hosts and the storage system are the same. The node management table 636 of the third proposed configuration shown in FIG. 52 further includes records of the added nodes 5 and 6 compared with the node management table 632 of the first proposed configuration shown in FIG. 48.

There is no host that makes the direct access to the node 5 and the node 6, and only the hosts to which the indirect access is assigned access the node 5 and the node 6. The number of nodes of the access destinations of the hosts to which the indirect access is assigned is increased compared with the first proposed configuration and the second proposed configuration, and the requested performance of the indirect access host to each node is thus reduced. As a result of the addition of the node 5 and the node 6, a margin of the performance limit of each node with respect to the requested performance is larger than that of the first proposed configuration and the second proposed configuration.

A description is now given of an example of the redundancy simulation in Step S207. FIG. 53 and FIG. 54 show node failure simulation tables for the first proposed configuration. Specifically, FIG. 53 is a node-failure host management table 651. The node-failure host management table 651 includes content in which simulation results are reflected in the host management table 631 of the first proposed configuration shown in FIG. 47. FIG. 54 is a node-failure node management table 652. The node-failure node management table 652 includes content in which simulation results are reflected in the node management table 632 of the first proposed configuration shown in FIG. 48.

FIG. 53 and FIG. 54 are the tables for showing the simulation results obtained when a failure occurs in the node 1. When a failure occurs in the node 1, the node 4 can cover the performance value of 500 IOPS exerted by the node 1. The same applies to a failure occurring in the node 2 or the node 3. However, when a failure occurs in the node 4, the performance value of 500 IOPS exerted by the node 4 cannot be covered by other nodes. Thus, the redundancy of the first proposed configuration is 0, and does not satisfy the redundancy requested by the request 1. Therefore, the first proposed configuration is discarded (Step S208).

FIG. 55 and FIG. 56 show node failure simulation tables for the second proposed configuration. Specifically, FIG. 55 is a node-failure host management table 653. The node-failure host management table 653 includes content in which simulation results are reflected in the host management table 633 of the second proposed configuration shown in FIG. 49. FIG. 56 is a node-failure node management table 654. The node-failure node management table 654 includes content in which simulation results are reflected in the node management table 634 of the second proposed configuration shown in FIG. 50.

FIG. 55 and FIG. 56 are the tables for showing the simulation results obtained when the failure occurs in the node 1. When a failure occurs in the node 1, a performance value of 470 IOPS exerted by the node 1 can be covered by other nodes. In the examples of FIG. 55 and FIG. 56, the node 5 is assigned to the host 1 that makes the direct access to the node 1. Moreover, the indirect access performance (120 IOPS) assigned to the node 1 is equally (30 IOPS)

assigned to the remaining nodes. Moreover, the requested performance of the host, to which the indirect access is assigned, directed to each node increases from 30 to 37.5.

The proposal processing program 301 similarly executes failure simulation from the other nodes 2 to 5. In this example, even when a failure occurs in any node, other nodes can cover the performance value exerted by the failed node.

FIG. 57 and FIG. 58 show simulation results obtained when a failure further occurs in the node 4 after the failure of the node 1 in the second proposed configuration. FIG. 57 is a node-failure host management table 655. The node-failure host management table 655 includes content in which simulation results are reflected in the node-failure host management table 653 shown in FIG. 55. FIG. 58 is a node-failure node management table 656. The node-failure node management table 656 includes content in which reflect simulation results are reflected in the node-failure node management table 654 shown in FIG. 56.

When a failure occurs in the node 4 after the node 1, the performance value of 500 IOPS exerted by the node 4 can be covered by other nodes. In the examples of FIG. 57 and FIG. 58, the node 5 is assigned to the host 6 that makes the direct access to the node 4 similarly to the host 1. The indirect access performance (150 IOPS) assigned to the node 4 is assigned to the node 5.

In this manner, the proposal processing program 301 increases the number of failed nodes from one to two, and then executes simulation for all combinations of two nodes. The proposal processing program 301 executes the simulation while increasing the number of failed nodes, to thereby determine the redundancy of the storage system. In the second proposed configuration of this example, when failures occur in the node 4 and the node 5, the performance thereof cannot be covered by the remaining nodes. Thus, the redundancy is one. When the simulation results satisfy the requested redundancy, the proposal processing program 301 may omit subsequent simulation.

FIG. 59 and FIG. 60 show node failure simulation tables for the third proposed configuration. FIG. 59 is a node-failure host management table 657. The node-failure host management table 657 includes content in which simulation results are reflected in the host management table 635 of the third proposed configuration shown in FIG. 51. FIG. 60 is a node-failure node management table 658. The node-failure node management table 658 includes content in which simulation results are reflected in the node management table 636 of the third proposed configuration shown in FIG. 52.

FIG. 59 and FIG. 60 are the tables for showing the simulation results obtained when the failure occurs in the node 1. When a failure occurs in the node 1, a performance value of 450 IOPS exerted by the node 1 can be covered by other nodes. In the examples of FIG. 59 and FIG. 60, the node 5 is assigned to the host 1 that makes the direct access to the node 1. Moreover, the indirect access performance (100 IOPS) assigned to the node 1 is equally (20 IOPS) assigned to the remaining nodes. Moreover, the requested performance of the host, to which the indirect access is assigned, directed to each node increases from 25 to 30.

The proposal processing program 301 similarly executes failure simulation from the other nodes 2 to 6. In this example, even when a failure occurs in any node, other nodes can cover the performance value exerted by the failed node.

FIG. 61 and FIG. 62 show simulation results obtained when a failure further occurs in the node 2 after the failure of the node 1 in the third proposed configuration. FIG. 61 is a node-failure host management table 659. The node-failure host management table 659 includes content in which simulation results are reflected in the node-failure host management table 657 shown in FIG. 59. FIG. 62 is a node-failure node management table 660. The node-failure node management table 660 includes content in which simulation results are reflected in the node-failure node management table 658 shown in FIG. 60.

When a failure occurs in the node 2 after the node 1, the performance value of 470 IOPS exerted by the node 2 can be covered by other nodes. In the examples of FIG. 61 and FIG. 62, the node 6 is assigned to the host 2 that makes the direct access to the node 2. The indirect access performance (120 IOPS) assigned to the node 2 is equally (30 IOPS) assigned to the remaining nodes.

In this manner, the proposal processing program 301 increases the number of failed nodes from one to two, and then executes simulation for all combinations of two nodes. The proposal processing program 301 executes the simulation while increasing the number of failed nodes, to thereby determine the redundancy of the storage system. The redundancy of the third proposed configuration of this example is two. When the simulation results satisfy the requested redundancy, the proposal processing program 301 may omit subsequent simulation.

FIG. 63 is a table for showing a configuration example of a proposed configuration list 820 that stores information on the proposed configurations that satisfy the user request when the node type B is selected. The proposal processing program 301 includes the proposed configurations whose simulation results satisfy the use request in the proposed configuration list 820, and stores the proposed configuration list 820 in the storage device. The proposal processing program 301 further displays the proposed configuration list 820 on the output device 135.

When the second proposed configuration is selected by the user in the proposed configuration list 820, the proposal processing program 301 displays a detailed image 830 of the second proposed configuration as shown in FIG. 64. Content of the details 830 of the second proposed configuration is the same as that of the node management table 634 of the second proposed configuration.

When the third proposed configuration is selected by the user in the proposed configuration list 820, the proposal processing program 301 displays a detailed image 835 of the third proposed configuration as shown in FIG. 65. Content of the details 835 of the third proposed configuration is the same as that of the node management table 636 of the third proposed configuration. With this display, the user can know the node configuration of the storage system that satisfies the request, and the coupling forms between the hosts and the storage system.

It should be noted that this invention is not limited to the above-described embodiments but include various modifications. For example, the above-described embodiments provide details for the sake of better understanding of this invention; they are not limited to those including all the configurations as described. A part of the configuration of an embodiment may be replaced with a configuration of another embodiment or a configuration of an embodiment may be incorporated to a configuration of another embodiment. A part of the configuration of an embodiment may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card or an SD card.

The drawings show control lines and information lines as considered necessary for explanations but do not show all control lines or information lines in the products. It can be considered that most of all components are actually interconnected.

What is claimed is:

1. A system configured to create and execute an extended configuration proposal of a storage system including multiple nodes, the system comprising:
    multiple existing nodes each existing node configured to monitor its operation performance;
    a processor; and
    a storage device configured to store instructions to be executed by the processor,
    wherein the processor is configured to:
        acquire information on requested performance of each host, which accesses the storage system;
        acquire the operation performance of each of the multiple existing nodes of the storage system;
        determine a number and performance of one or more additional nodes and a coupling form between the host and the storage system so as to satisfy the requested performance of each host;
        include the number and the performance of the one or more additional nodes and the coupling form in the extended configuration proposal,
    receive an instruction to execute the extended configuration proposal and execute the extended configuration proposal.

2. The apparatus according to claim 1,
    wherein the host comprises one or more existing hosts, and
    wherein the requested performance of each of the one or more existing hosts is monitored operation performance of each of the one or more existing hosts.

3. The apparatus according to claim 1,
    wherein the processor is configured to determine the number and the performance of the one or more additional nodes and the coupling form so as to satisfy a request for redundancy of the storage system, and
    wherein the redundancy indicates a permissible number of failed nodes that allows the requested performance of each host to be satisfied.

4. The apparatus according to claim 1, wherein the processor is configured to create another extended configuration proposal having a larger number of additional nodes than the number of additional nodes of the extended configuration proposal.

5. The apparatus according to claim 1,
    wherein types of the one or more additional nodes of the extended configuration proposal are common, and
    wherein the extended configuration proposal indicates the minimum number of additional nodes that satisfies a request for the storage system, which is set in advance.

6. The apparatus according to claim 1,
    wherein the one or more additional nodes in the extended configuration proposal have the same node type, and
    wherein the processor is configured to further create another extended configuration proposal in which an additional node has a node type different from the node type.

7. The apparatus according to claim 1,
    wherein one of a direct access and an indirect access is assigned to each host,
    wherein the host to which the direct access is assigned is configured to be able to access only a specified node, and the specified node is configured to store data of the host to which the direct access is assigned,
    wherein the host to which the indirect access is assigned is configured to be able to access all of nodes included in the storage system, and
    wherein the processor is configured to assign one of the direct access and the indirect access to each host so as to satisfy the requested performance of each host, and determine an access destination of the host to which the direct access is assigned.

8. The apparatus according to claim 7, wherein, when the requested performance of a host selected from the hosts is able to be satisfied through use of the indirect access, the processor assigns to the selected host the indirect access with priority over the direct access.

9. A method of creating, and executing an extended configuration proposal of a storage system including multiple nodes, the method comprising:
    acquiring, information on requested performance of each host, which accesses the storage system;
    monitoring by each of multiple existing nodes operation performance of each of the multiple existing nodes;
    acquiring, information on performance of each of multiple existing nodes forming the storage system;
    determining, a number and performance of one or more additional nodes and a coupling form between the host and the storage system so as to satisfy the requested performance of each host; and
    including, the number and the performance of the one or more additional nodes and the coupling form in the extended configuration proposal,
    receiving an instruction to execute the extended configuration proposal and
    executing the extended configuration proposal.

* * * * *